(12) United States Patent
Flitsch et al.

(10) Patent No.: US 10,697,134 B2
(45) Date of Patent: Jun. 30, 2020

(54) METHODS AND APPARATUS FOR MOBILE ADDITIVE MANUFACTURING

(71) Applicants: Robert A. Flitsch, New Windsor, NY (US); Frederick A. Flitsch, New Windsor, NY (US)

(72) Inventors: Robert A. Flitsch, New Windsor, NY (US); Frederick A. Flitsch, New Windsor, NY (US)

(*) Notice: Subject to any disclaimer, the term of this patent is extended or adjusted under 35 U.S.C. 154(b) by 0 days.

(21) Appl. No.: 16/324,058

(22) PCT Filed: Aug. 14, 2018

(86) PCT No.: PCT/US2018/046749
§ 371 (c)(1),
(2) Date: Feb. 7, 2019

(87) PCT Pub. No.: WO2020/036594
PCT Pub. Date: Feb. 20, 2020

(65) Prior Publication Data
US 2020/0056336 A1 Feb. 20, 2020

(51) Int. Cl.
*E01C 19/17* (2006.01)
*B33Y 50/02* (2015.01)
*B33Y 30/00* (2015.01)
*B33Y 10/00* (2015.01)
*G05D 1/02* (2020.01)

(52) U.S. Cl.
CPC ............. *E01C 19/17* (2013.01); *B33Y 10/00* (2014.12); *B33Y 30/00* (2014.12); *B33Y 50/02* (2014.12); *G05D 1/0219* (2013.01)

(58) Field of Classification Search
CPC ......... E01C 19/17; B33Y 50/02; B33Y 30/00; B33Y 10/00; G05D 1/0219
See application file for complete search history.

(56) References Cited

U.S. PATENT DOCUMENTS

| | | | | | |
|---|---|---|---|---|---|
| 5,333,969 | A | * | 8/1994 | Blaha | E01C 19/46 404/102 |
| 5,439,313 | A | * | 8/1995 | Blaha | E01C 19/46 404/101 |
| 6,186,700 | B1 | * | 2/2001 | Omann | C04B 26/26 404/79 |
| 9,303,368 | B2 | * | 4/2016 | Reda | G05D 1/0011 |
| 9,903,078 | B2 | * | 2/2018 | Ali | E01C 23/07 |

(Continued)

OTHER PUBLICATIONS

L. Marques, R. Williams, W. Zhou, "A Mobile 3D Printer for Cooperative 3D Printing," in Proc. 28th Annual International Solid Freeform Fabrication Symposium, pp. 1645-1660, 2017 (Year: 2017).*

(Continued)

*Primary Examiner* — Peter D Nolan

(57) ABSTRACT

The present disclosure provides various advancements for mobile and automated processing utilizing additive manufacturing. The present disclosure includes methods for the utilization of mobile and automated processing apparatus and may include examples of sealcoating operations. In some examples, omnidirectional drive systems such as Mecanum wheels may create novel operational aspects. Artificial intelligence techniques may enhance operations and may be used to create model for the processing apparatus.

9 Claims, 19 Drawing Sheets

(56) References Cited

U.S. PATENT DOCUMENTS

| | | | |
|---|---|---|---|
| 9,948,898 B2* | 4/2018 | Barfield, Jr. | H04N 7/185 |
| 9,970,758 B2* | 5/2018 | Shah | G01B 11/303 |
| 10,066,348 B2* | 9/2018 | Yun | E01C 23/096 |
| 10,087,589 B2* | 10/2018 | Yun | E01C 23/07 |
| 10,190,269 B2* | 1/2019 | Shah | E01C 23/01 |
| 2003/0069668 A1* | 4/2003 | Zurn | E01C 19/006 700/245 |
| 2011/0219899 A1 | 9/2011 | Dize et al. | |
| 2014/0374933 A1* | 12/2014 | Flitsch | E01C 23/0966 264/36.1 |
| 2016/0032536 A1* | 2/2016 | Reda | G05D 1/0011 404/75 |
| 2016/0032540 A1* | 2/2016 | Reda | E01C 11/005 404/75 |
| 2016/0093212 A1* | 3/2016 | Barfield, Jr. | H04N 7/185 348/144 |
| 2017/0204569 A1* | 7/2017 | Shah | E01C 23/01 |
| 2017/0226709 A1* | 8/2017 | Ali | E01C 23/07 |
| 2017/0238595 A1 | 8/2017 | Atureliya | |
| 2017/0305137 A1 | 10/2017 | Flitsch et al. | |
| 2017/0314918 A1* | 11/2017 | Shah | G01B 11/303 |
| 2017/0342669 A1* | 11/2017 | Yun | E01C 23/07 |
| 2017/0350698 A1* | 12/2017 | Shah | G01B 11/303 |
| 2017/0370053 A1* | 12/2017 | Yun | E01C 23/07 |
| 2017/0372480 A1 | 12/2017 | Anand et al. | |
| 2019/0055699 A1* | 2/2019 | Flitsch | H04W 4/40 |
| 2019/0147331 A1* | 5/2019 | Arditi | G06K 9/00 706/20 |
| 2019/0154442 A1* | 5/2019 | Annovi | G06T 7/593 |
| 2019/0188501 A1* | 6/2019 | Ryu | G06K 9/00805 |
| 2019/0240912 A1* | 8/2019 | Alves | B29C 64/20 |

OTHER PUBLICATIONS

G. Younes, C. Attia and Z. Djelloul, "Supervised learning and automatic recognition of asphalt pavement deteriorations," In Proc. 2009 IEEE/ACS International Conference on Computer Systems and Applications, pp. 205-210, 2009 (Year: 2009).*

A. Cubero-Fernandez, J. Rodriguez-Lozano, R. Villatoro, J. Olivares and J. Palomares, "Efficient pavement crack detection and classification," EURASIP Journal on Image and Video Processing, 2017 (Year: 2017).*

* cited by examiner

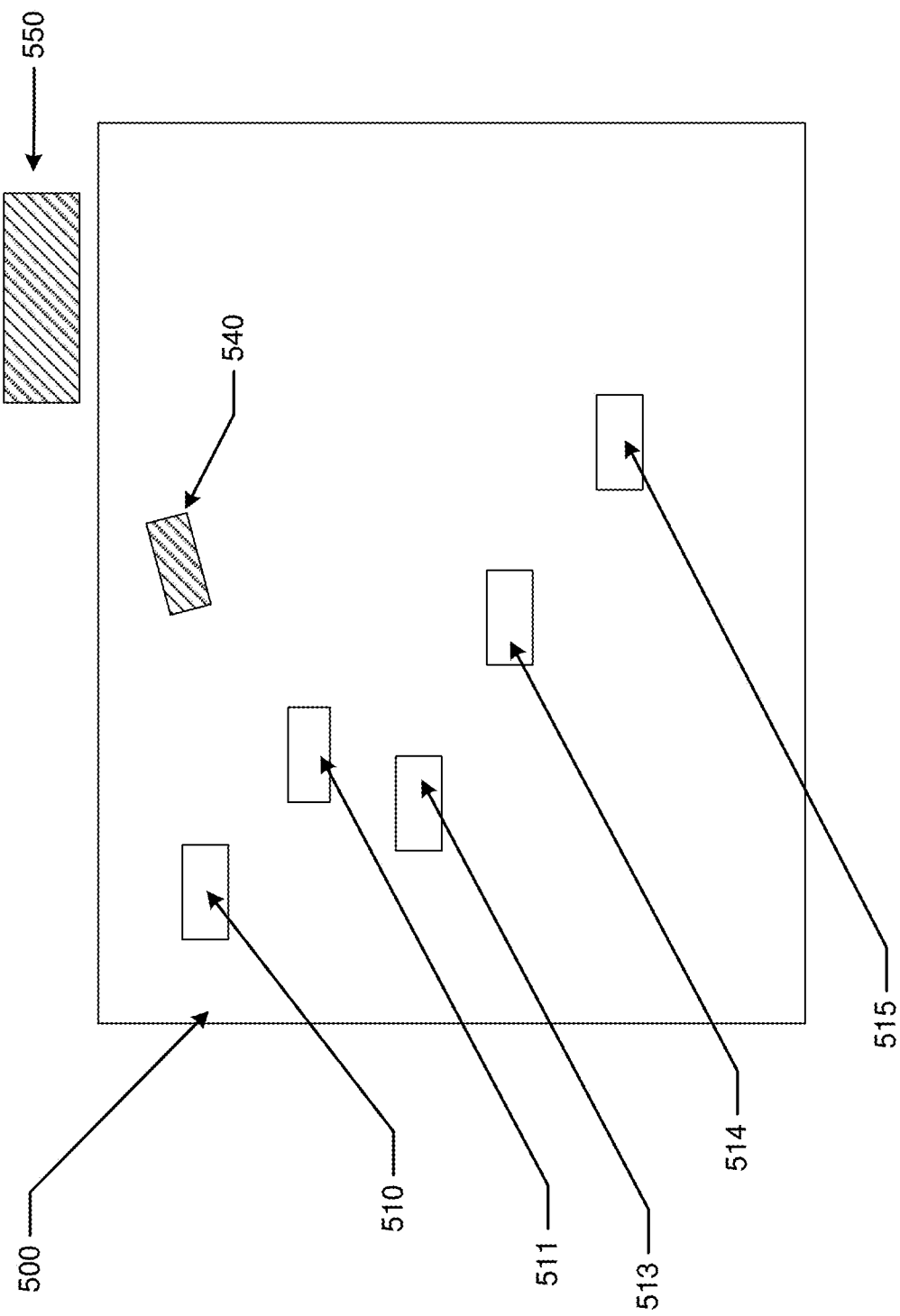

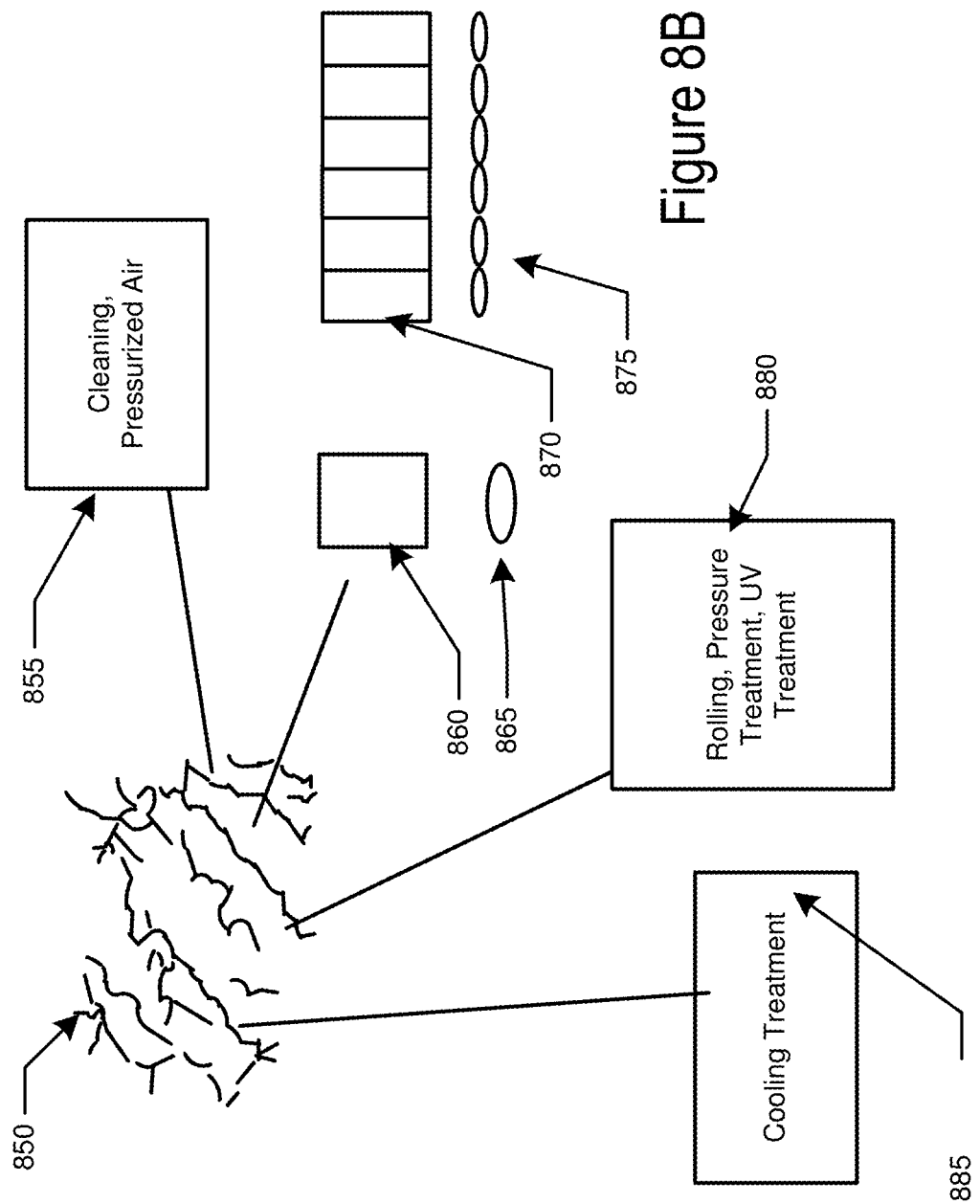

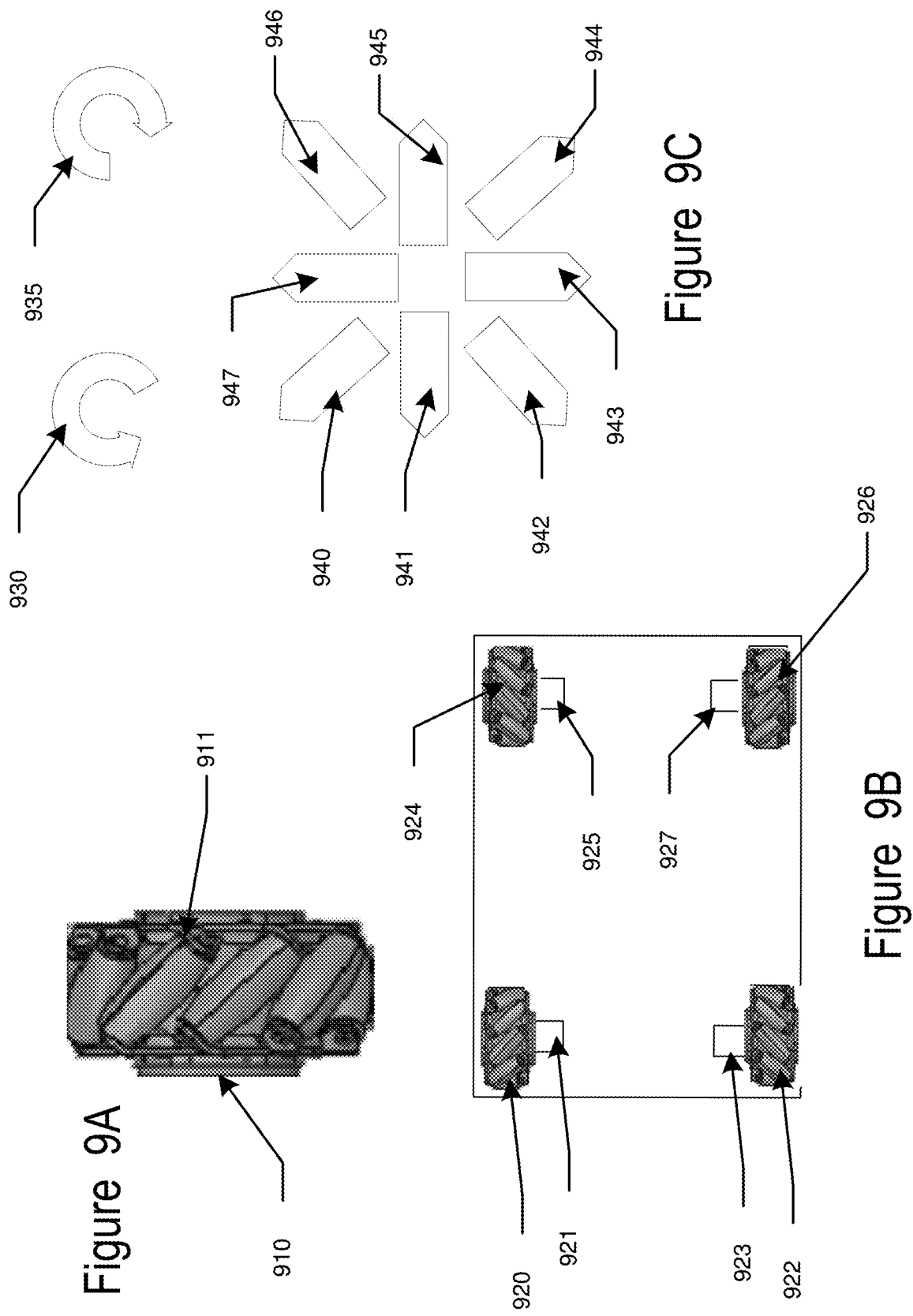

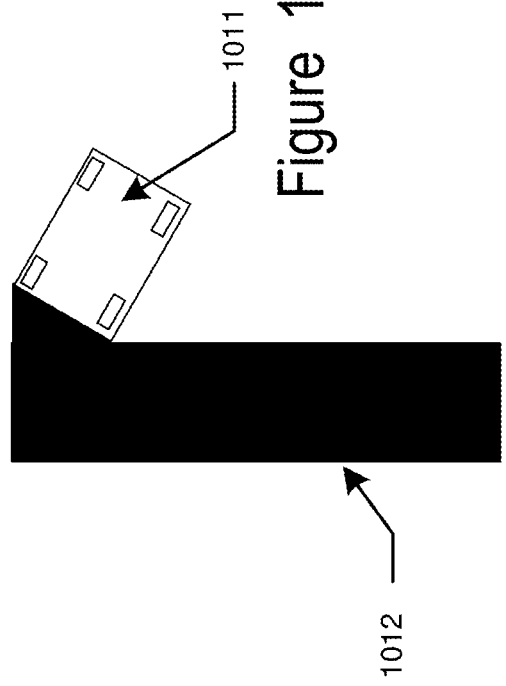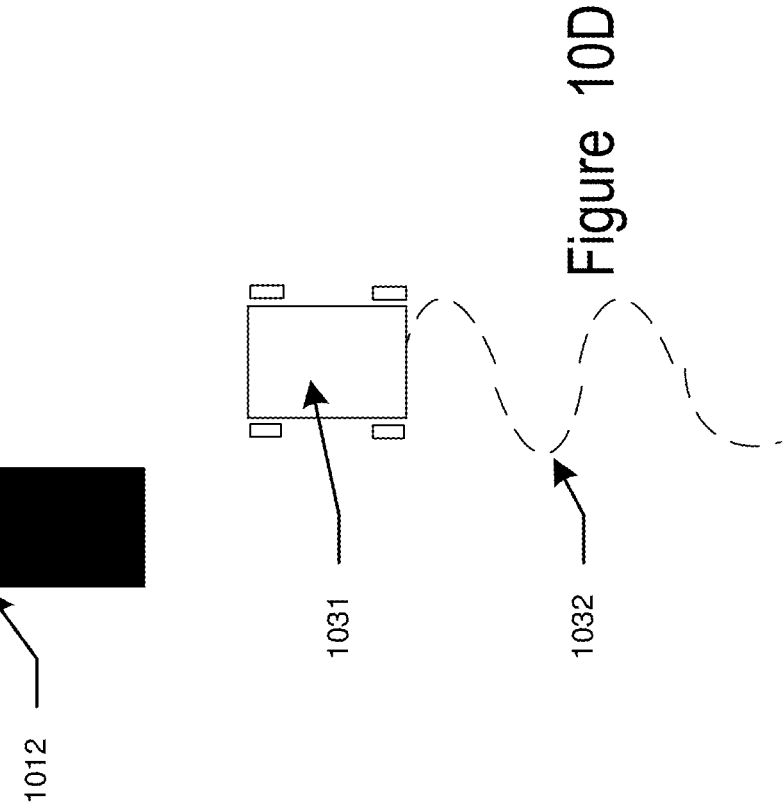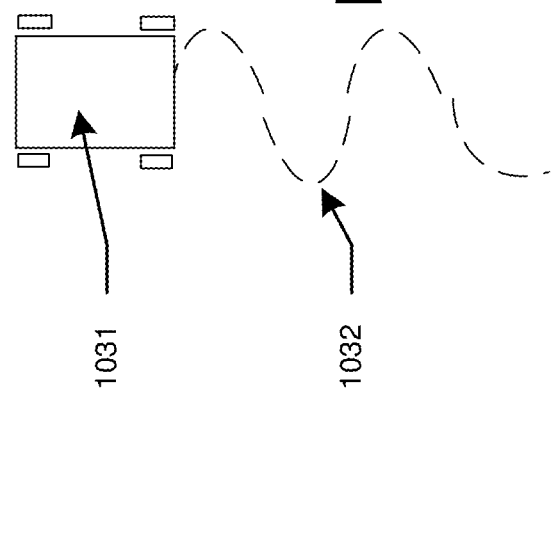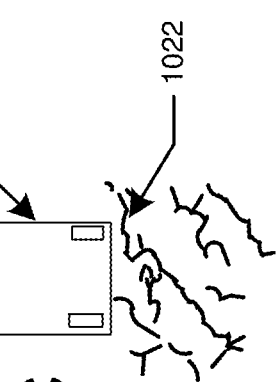
Figure 10A
Figure 10B
Figure 10C
Figure 10D

METHODS AND APPARATUS FOR MOBILE ADDITIVE MANUFACTURING

FIELD OF THE INVENTION

The present disclosure relates to methods and apparatus that support mobile additive material processing. Robotic and human controlled mobility may be combined with additive manufacturing techniques that "print" or additively deliver materials to specific locations over significant distances. The methods and apparatus may be applied to the productions of advanced building structures and roadways.

BACKGROUND OF THE INVENTION

A known class of approaches to material fabrication can be classified as additive manufacturing. Material in various forms, including solid, powder, gel, gas, or liquid forms may be processed in such a manner to deposit or lock in material in a target location in space.

Numerous techniques may be utilized to perform additive manufacturing. In extrusion processes, materials in wire or filament form are controlled by an extrusion head which may be moved above a work area. The use of multiple extrusion heads and extrusion material may allow for both permanent and temporary structures to be formed. By building the extruded material in layers or in regions, complex shapes may be formed in three dimensions. However, the technology is limited by the dimensions of the work space—the ability of the head or heads to move in the two dimensions of a plane and by the dimension of the ability of the head to move vertically relative to a planar support structure. There may be numerous variations on this form of additive manufacturing.

A different class of additive manufacturing may be classified as Stereolithography. In this class, a light or heat source is used to transform the material in space. In some Stereolithography implementations, the work support plane is submerged in a photoactive or thermo-active liquid and a laser or other light or heat source is rastered across a thin surface layer of the liquid between the support structure and the top level of the liquid. By translating the support structure down a layer into the liquid, the fluent nature of the liquid reforms a thin layer of new unreacted material over the work surface or the previously processed layer.

Versions of Stereolithography may also work with powder formed starting material. The powder may be shaped into a thin layer and then spatially defined. Lasers may be used to transform portions of the layer into a solidified material. In other examples, other energy sources such as, for example, electron beams, may be used to transform the powder. Various materials including metals, insulators and plastics may be formed into three dimensional shapes by these processing techniques.

A different type of processing occurs when a print head is used to deposit material onto the powder. The deposit may chemically react with the powder or may be an adhesive that consolidates the powder into an adhered location. The prevalence of high resolution printing technology may make this type of additive manufacturing process cost effective.

The field is both established, with versions of additive manufacturing being practiced for decades, and emerging, with new techniques and materials being defined with rapidity. The technology may be currently limited by the dimensions of objects that may be produced. Accordingly, it may be desirable to develop methods and apparatus that allow additive manufacturing techniques and apparatus to be independently mobile and to continuously improve these new methods and apparatus.

SUMMARY OF THE INVENTION

Accordingly, the present disclosure provides description for methods and apparatus that allow for mobile additive manufacturing. In some examples, the mobile additive manufacturing apparatus may act in an independent or automated manner. The apparatus that performs the mobile additive manufacturing may be called an Addibot (ADDItive roBOT).

An important characteristic of additive manufacturing apparatus may be that material is added to a product in a controlled manner that is driven by a digital model that resides in a controller. Through the processing of the additive manufacturing apparatus the digital representation may be translated to a physical approximation of material placed in three-dimensional space.

Accordingly, in some examples disclosed in this disclosure, a mobile additive manufacturing apparatus, which may be called an Addibot, may be configured to comprise a drive system which may be operative to move the apparatus along a surface. In some examples the Addibot may function with no physical tether. Advanced drive systems may incorporate omnidirectional drive capabilities without or in addition to steering components. In steered systems the direct drive components may move in a general forward and reverse direction. An omnidirectional drive component can directly impart other movements such as translational movements, to forward and back, turned movements around the center of motion, and turns during a general translational movement. An example of an omnidirectional drive component may be Mecanum wheels driven by independently controllable motors.

In addition, the Addibot may comprise a navigation system which among other functions may determine the Addibots' current location and its current bearing or direction that it would travel in when caused to move or is travelling in if moving.

The Addibot may additionally comprise a controller capable of executing code which may perform an algorithmic function. In some examples such a controller may also be classified as an algorithmic processor. The controller may also provide controlling signals to other elements of the Addibot. The controller may include hardware and encoded programs tailored to perform cognitive functions, machine learning or artificial intelligence. In some examples, the controller may interact with communication systems to link to external "control nodes" that can with communication function as part of the overall controller function.

The Addibot may additionally comprise an additive manufacturing system to deposit a material or combination of materials in prescribed locations across the surface that the Addibot is on or will move to during its processing. The additive manufacturing system may add material to a surface based on a digital model that may be processed in one or more controllers that may be located in the Addibot.

The origin of the digital model may be determined externally to the Addibot or alternatively may be determined by sensing or other processing of the Addibot or may be a combination of external model definition combined with the data related to sensing apparatus within the Addibot. Artificial intelligence algorithms may be used in the generation and optimization of models.

The systems that the Addibot has may be powered by a power system capable of providing power to operate at least the drive system, the navigation system, the control system, and the additive manufacturing system of the Addibot. In some examples multiple power systems may be present in an Addibot.

The additive manufacturing system of an Addibot may include many different types and definitions capable of adding material based on a digital model in controlled fashion. In some examples, the additive manufacturing system may comprise a three-dimensional ("3D") printing head. The printing head may include a spray system that may spray liquids such as pavement sealers upon a surface. In some examples, the spray system may rotate while it sprays material. In other examples, a rotating blade which may be flexible may scrape sealing material across a surface to distribute it across a surface while the mobile apparatus moves.

In some examples, the Addibot may also comprise a vision system. The vision system may be operant to create a digital model of the topography of a surface in a region proximate to the mobile additive manufacturing apparatus. The vision system may operate on or within the Addibot and use a variety of detection schemes for analyzing the surface and creating the model of the surface including light or laser-based imaging techniques or other electromagnetic radiation-based imaging including infrared, ultraviolet or other electromagnetic radiation sources. In some examples, the vision system may utilize sound-based radiations to create a digital model of its surroundings which may include the surface in the region of the Addibot. In other examples, the Addibot may deploy a physical sensor to determine the topography of the surface in a region studied by the vision system. A controller located within the Addibot may initiate the operation of the vision system and may receive signals in response to the metrology that the vision system performs. In other examples, the Addibot may communicate with a vision system that is located external to itself or on another Addibot for example. Any of these vision systems may provide their digitized data to systems operating artificial intelligence algorithms which may enhance pattern recognitions effectiveness and also operational speed.

In some examples, the Addibot may also comprise a material storage system capable of storing at least a first material to be supplied to the additive manufacturing system. The stored material may include solids, powders, gels, liquids, or gasses, to mention some non-limiting examples. In some examples, the material may be in wire forms or in some example may exist as physical solid entities which are placed by the additive manufacturing system. The material storage system may maintain a storage condition for the material by controlling an environmental condition. The condition that may be controlled may include one or more of temperature or pressure of the material.

In some examples, the Addibot may also comprise a surface preparation system. The surface preparation system may be capable of removing one or more of flaked surface material, dust, dirt, and debris from the surface region in a region in advance of the additive manufacturing apparatus. Since the Addibot may move or when stationary the additive manufacturing system within the Addibot may move in a direction, the surface preparation system may be operant to process a region of the surface where the additive manufacturing system on its own or under the drive system of the Addibot may move to.

In some examples, the Addibot may also comprise a communication system that may be capable of transmitting signals outside the mobile additive manufacturing apparatus. In some examples users may use communications systems external to the Addibot in transmitting a control signal or control signals to the Addibot. The communication system may also be capable of receiving signals originating outside of the mobile additive manufacturing apparatus. In some examples, the signals transmitted or received may comprise one or more of radiofrequency signals, infrared signals, optical signals or sound-based signals or emissions as non-limiting examples. In some examples the communication system may function to sense the environment of the mobile additive manufacturing apparatus. A communication protocol through the communication system may involve the use of artificial intelligence techniques that may be operating either or both at the unit or remote from the unit. A team of Addibots may communicate with a local processing node which may perform artificial intelligence techniques. Alternative one or all of the processing systems of the Addibot, a team of Addibots, a local processing node or a remote processing node may act with artificial intelligence techniques. Sensing may occur in addition to signal transmission function. In some examples, there may be multiple communication and/or sensing systems within an Addibot.

There may be numerous methods related to a mobile additive manufacturing apparatus. In some examples a user may transmit a signal to an Addibot which may include any of the types of examples of apparatus that have been described. The transmitted signal may cause the Addibot to next deposit a first layer of material on a surface utilizing systems of the Addibot. The Addibot may, in continued response to the initial signal, move from a first location to a second or different location. After moving the Addibot may in further continued response to the initial signal deposit a second layer of material. The makeup of the first layer and second layer of material may be different in composition or physical aspects such as thickness or may be identical except in the aspect that it is located in a second location.

In some examples, the methods may additionally include omnidirectional drive system aspects.

In some examples, the apparatus may include artificial intelligence processing capability. The artificial intelligence system may operate as a discrete or separate system or may be a sub-system of the general controller of the Addibot. In some examples, the artificial intelligence system may include an artificial intelligence chip, circuit board or assembly which may be customized to interface with some or all of the systems of an Addibot.

In some examples, the methods may additional include spray systems to distribute material such as pavement sealant. In some examples the methods may include rotational flexible blade systems to distribute materials such as pavement sealant.

In some examples, the methods may additionally include a step to perform a metrology process to measure the topography of a region of a surface. This may typically be in a region proximate to the Addibot or in a region that the Addibot will move to. In some examples additional steps in the method may include processing the result of the metrology process and using the result of the processing to control the additive manufacturing system of the Addibot. The results of the metrology may be provided to a controller with artificial intelligence capabilities.

In some examples the methods relating to processing by an Addibot may include the step of depositing a layer where a material comprises water. In some of these examples, the surface upon which the material is deposited may be comprised of water. In some of these examples, the surface comprised of water may be a surface where the water is in a solid form, which may be water ice.

Implementations may include special forms of drive systems that allow for omnidirectional movement. This may include wheel systems that allow for linear movement at any or many possible angles with respect to the center of mass of the apparatus. This may also include drive systems that turn with no turning radius, allowing for full orientation of the apparatus at any angle of rotation with respect to the center of mass of the apparatus. If these two characteristics are combined in a drive system, the exemplary drive system may be able to move in a particular linear path over a surface while, at the same time, changing its rotational orientation. Combining this exemplary drive system with a distribution system that is fixed to the drive system but operant outside of the area between or under the components of the drive system, this distribution system may be guided in a particular path over a surface that allows this distribution system to cover the entire surface it is passing over without the area between or under the components of the drive system ever passing over any area that was already distributed upon. This creates a completely novel manner of controlling mobility in a mobile additive manufacturing robot.

One general aspect includes a mobile additive manufacturing apparatus including: an omnidirectional drive system operative to move the apparatus along a surface, where the omnidirectional drive system employs at least a first omnidirectional wheel directly attached to a first motor, and where the first motor has operational modes to be engaged in a forward moving, reverse moving or stationary configuration, a navigation system to determine location; a mobile additive manufacturing apparatus controller capable of executing algorithms and providing control signals, a vision system capable of scanning the surface and measuring a topography of the surface; an artificial intelligence processing system, where the artificial intelligence processing system includes a program which executes at least a first algorithm, where the first algorithm utilizes one or more of k-means clustering, adaptive resonance, reinforcement learning, or q-learning processing, and where a data-bus of the vision system directly couples to the artificial intelligence processing system, and where the artificial intelligence processing system uses one or more of a trained database of roadway defects and a dynamically trained database of additive manufacturing processed roadway defects processed by the mobile additive manufacturing apparatus; an additive manufacturing system to deposit at least a first material in a prescribed location on the surface according to a digital model processed by one or more of the mobile additive manufacturing apparatus controller or the artificial intelligence processing system, where the additive manufacturing system deposits material while the omnidirectional drive system changes a direction of movement of the mobile additive manufacturing apparatus using a change in an operational mode of at least the first omnidirectional wheel; and a power system capable of providing power to operate at least the drive system, navigation system, mobile additive manufacturing apparatus controller and additive manufacturing system. Other embodiments of this aspect include corresponding computer systems, apparatus, and computer programs recorded on one or more computer storage devices, each configured to perform the actions of the methods.

Implementations may include one or more of the following features. The method where the additive manufacturing system deposits seal coating material where the one or more of a spray system or drip system components are attached to a rotational gantry, where a rotational orientation is set according to the first digital model. The method where the first digital model includes a path plan where the omnidirectional drive system is used to create a continuous movement flow of the mobile additive manufacturing apparatus during operation of the additive manufacturing system where wheels of the omnidirectional drive system do not pass over portions of the surface that have been processed with the additive manufacturing system. Implementations of the described techniques may include hardware, a method or process, or computer software on a computer-accessible medium.

BRIEF DESCRIPTION OF THE DRAWINGS

The accompanying drawings, that are incorporated in and constitute a part of this specification, illustrate several examples of the invention and, together with the description, serve to explain the principles of the invention:

FIG. 5 illustrates aspects of team action of mobile automated additive manufacturing apparatus.

FIG. 8B illustrates exemplary methods related to repair of exemplary crack type road defects.

FIGS. 9A-9F illustrate exemplary aspects of omnidirectional drive systems.

FIGS. 10A-10 D illustrate exemplary aspects of paths that can be taken with omnidirectional drive systems.

DETAILED DESCRIPTION OF PREFERRED EXAMPLES

The present disclosure relates to methods and apparatus for mobile automated additive manufacturing. As used herein, "mobile automated additive manufacturing" may include control of locomotion of an additive manufacturing apparatus over a surface free of tracks or rails. A number of descriptions of mobile additive manufacturing have been described by the inventors in other specification including the U.S. Non-Provisional patent application Ser. No. 14/310, 443, filed on Jun. 20, 2014 and entitled METHODS AND APPARATUS FOR MOBILE ADDITIVE MANUFACTURING, the U.S. Provisional Application Ser. No. 61/434,302 filed on Jun. 23, 2013, and the U.S. Non-Provisional patent application Ser. No. 14/310,556, filed on Jun. 20, 2014 and entitled METHODS AND APPARATUS FOR MOBILE ADDITIVE MANUFACTURING OF ADVANCED STRUCTURES AND ROADWAYS. The content of these three applications is included herein by reference. Furthermore, concepts involving machine learning and more broadly artificial intelligence have been described and will be discussed in this specification. An example of exemplary machine learning protocols and associated algorithms may be found within the U.S. Pat. No. 9,904,889 entitled METHODS AND SYSTEMS FOR ARTIFICIAL COGNITION the contents of which are included herein by reference.

The fields of building and roadway construction are also established with regards to equipment used for tasks involving maintenance or construction of surfaces. Various pieces of equipment have been developed to apply materials to a work site in these tasks, such as sealcoating, defect repair, and construction of new objects. Many of these tools must be guided manually by human eyes and hands, or suffer from other problems regarding precision, bandwidth, and safety for workers, that it may be desirable to introduce the above-stated merits of additive manufacturing methods. Some emerging technologies in these construction fields exhibit some additive manufacturing principles, such as a huge cement extrusion device that prints castle walls inside its workspace, but still come with a host of issues that limit their effectiveness in the field. Many of the merits of novel mobile additive manufacturing may be directed towards solving or mitigating these issues.

Figure 1A:
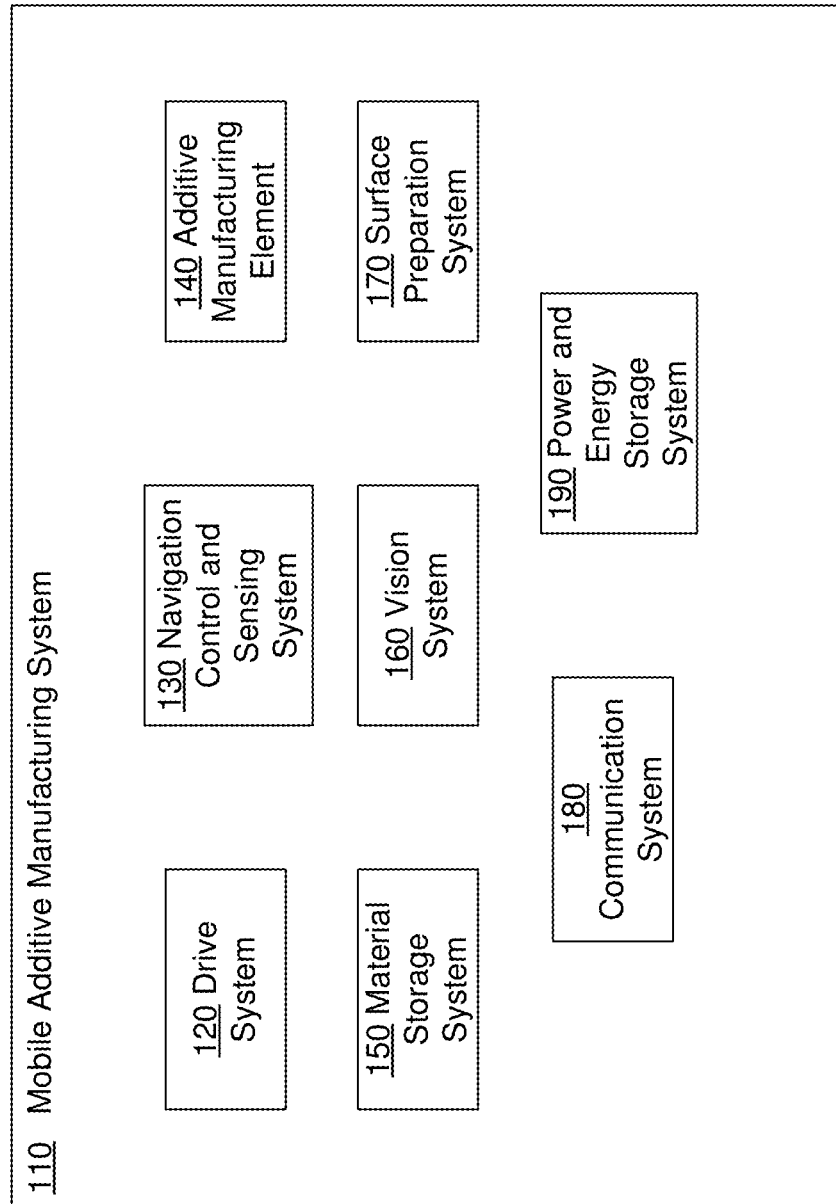
FIG. 1A illustrates a block diagram of the exemplary general components of a mobile automated additive manufacturing apparatus.

Referring to FIG. 1A, 100, some elements of an exemplary mobile additive manufacturing system (110) may be found. The system may have a drive system 120 enabling transportation of the manufacturing system over a surface. The drive system 120 may function to move the apparatus on both flat and shaped or curved topography. The drive system 120 may function on wheels, balls, tracks, or other means of conveyance known in the art. In some examples, the use of automotive or truck frames either with trailers or with modification directly to the frame itself may be used. The drive system 120 may incorporate a drive mechanism comprising an engine or motor that may act upon the conveyance elements such as wheels or may utilize transmissions and axles to drive the conveyance elements. Various forms of directional or steering control may be possible. In some examples, the differential control of multiple motors acting upon conveyance elements may allow for directional control. In other examples, the directional control may function by a steering system that moves the conveyance elements in ways other than in its drive sense. In some examples the design of the wheels and the drive systems for the wheels can define omnidirectional drive systems. In some examples three or four engineered wheels can be used to move the system in all linear directions and rotary directions without an independent steering system. Such systems can create unique operational schemes for Addibot operations where the portion that performs additive manufacturing can be moved over surfaces without the drive system passing over the treated surface even when the system turns a corner or passes back along a path.

Figure 1B:
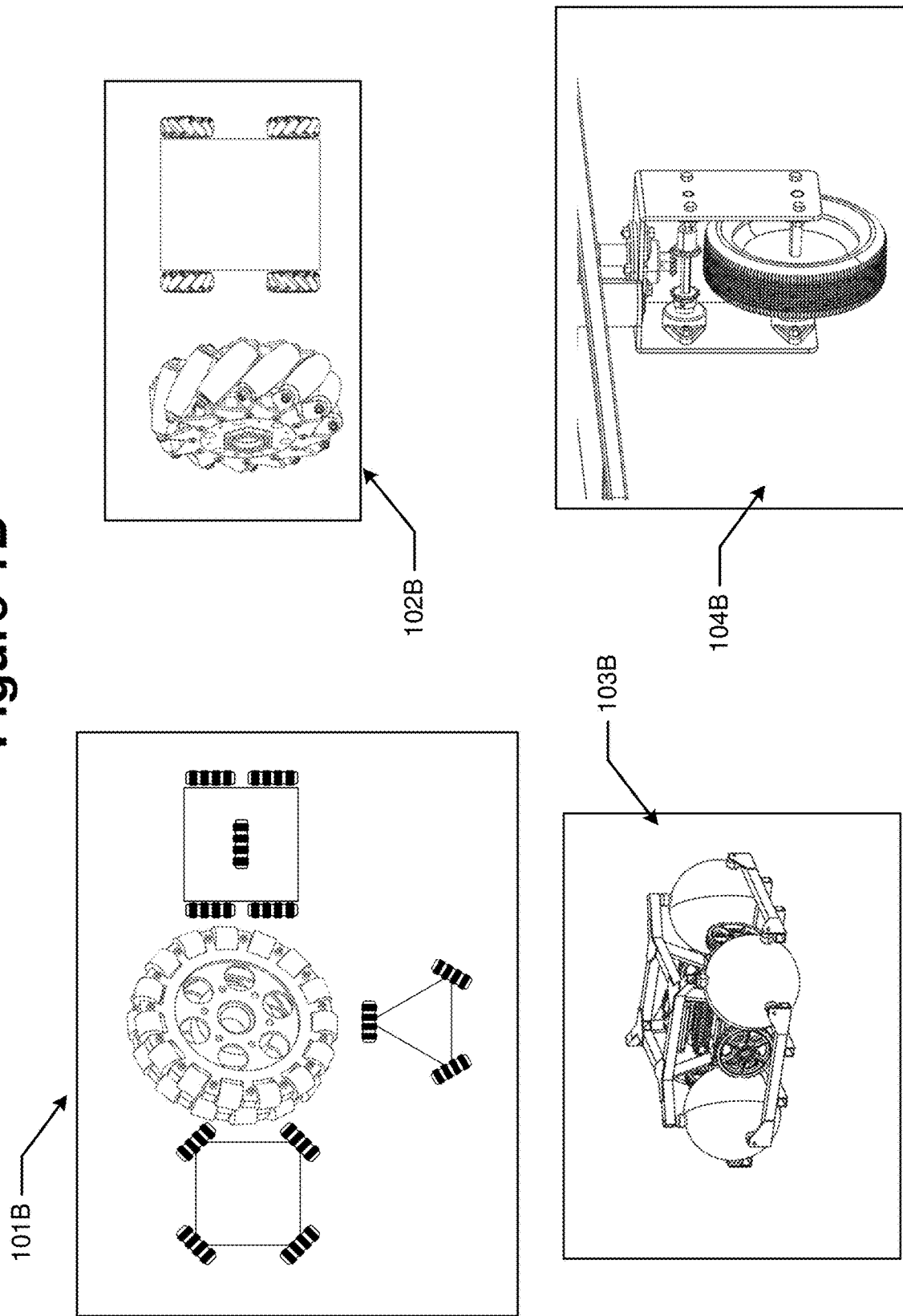
FIG. 1B illustrates examples of omnidirectional drive system types.

Referring to FIG. 1B, exemplary omnidirectional drive systems with exemplary wheel or wheel equivalent drive element configuration are illustrated. For example, at 101B an exemplary omni wheel is shown along with some 3, 4 and 5-wheel configurations. At 102B and exemplary Mecanum wheel is shown along with a 4-wheel configuration. Further, at 103B a spherical wheel-based system is illustrated. At 104B a rotatable cylindrical wheel example is illustrated. To varying degrees of effectiveness, these examples illustrate potential systems which could give a robotic base directional control without a standard steering system. Uniquely, in a mobile additive manufacturing system omnidirectional drive system when synergistically coupled with the operations of additive manufacturing systems creates different modes of operation that are not possible in conventionally driven systems.

Referring again to FIG. 1A, the mobile additive manufacturing system 110 may include a Navigation, Control and Sensing system 130 that may function to determine a current location to a desired degree of accuracy as well as an orientation of the device at that location. Such information may be useful in regulating direction control through the navigation system and in determining other control variables such as speed. The sensing system may provide other environmental information to the control system such as temperature and humidity at the location and in some examples at a surface beneath the location of the system. In addition, the sensor and navigation elements may also function to provide awareness of obstacles in the environment of the mobile additive manufacturing apparatus. A separate vision, measurement and inspection system may be present in some examples (a following discussion discusses this in detail) and may interface with the control elements or sensing elements. The control elements may receive data in various forms and may process the data utilizing computational hardware and programming algorithms. The processing may produce control signals to engage the mobile additive manufacturing apparatus to produce an environmental change such as adding material of various forms to create three-dimensional surface characteristics such as a flat surface, a surface of defined topography or a surface where defects of various types are affected with the addition of material. In other examples, the addition of material may be used to create an image or another functional aspect such as a slip resistive coating or a tread cleaning function as examples.

The navigation element may utilize various protocols to generate location awareness. For example, the element may utilize GPS technology. In other examples, a local transceiver network may provide telemetry local relative location awareness through the use of RF systems, or light-based systems such as a laser-based system This local system may function within an outdoor region or alternatively be set up to function within a building. Cell phone-based telemetry, and other schemes such as seismic location detection may provide information for telemetry. In some examples, the navigation element may provide a first order telemetry to an accuracy required to control movement of the apparatus, for example. The vision system (to be discussed) or other sensing elements may provide a next higher accuracy for calibration of location. Location marks may be present upon or within the surface and a sensor such as a camera system, for example, may pick up the location marks to calibrate the navigation system and the control system. Various other reference elements such as physically defined lines, such as found on roads or parking lots may be a type of navigation control system. Still further examples may involve the embedding of conductive wires to create a navigation information system. A grid of such conductive wires may create a calibrated work floor with a good deal of accuracy. In still further examples, the surface to be acted on by the mobile additive manufacturing apparatus may be a temporary surface that may itself be moved. Sheets of a temporary material may function as the surface and these sheets as well may include coloration and/or physical elements such as embedded conductors to provide a telemetry signal for the navigation element.

The Navigation, Control and Sensing system 130 may function to define a path that the mobile additive manufacturing apparatus follows in its process. In other examples, the path itself may be figured into the design of a desired topography. For example, in some examples it may be necessary for the mobile additive manufacturing apparatus (Addibot) to travel along a road surface and perform additive manufacturing based on aspects that it measures or determines of the surface as it travels. In other examples, the shape of a feature to be deposited across a surface may involve the control of the navigation system to move the Addibot to a location where the additive manufacturing element can further control the additive process. In these cases, the path of the Addibot could be arbitrarily complex based on a model that it follows to generate an end result.

Figure 1C:
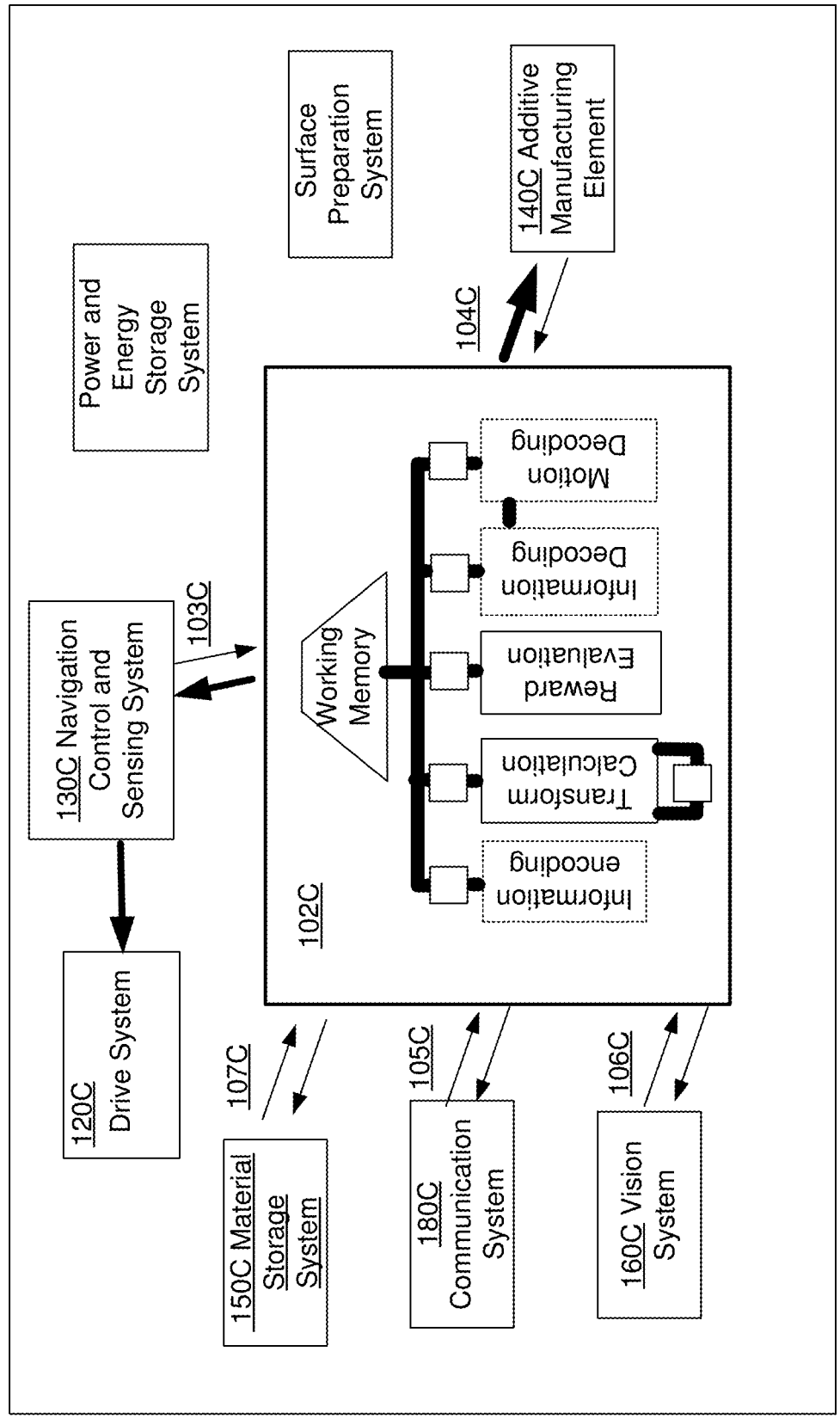
FIG. 1C illustrates examples of the interaction of artificial intelligence software and hardware with general components of a mobile automated additive manufacturing apparatus.

The Navigation, Control and Sensing system 130 may include aspects of artificial intelligence such as algorithms to process and use sensing data by machine based learning and other artificial intelligence protocols. Hardware including processing units may be customized in design for artificial intelligence-based processing. The vision system in particular may be directly coupled with customized artificial intelligence-based processing equipment including artificial intelligence algorithms. Referring to FIG. 1C, an exemplary structure of an artificial based processing system or algorithm which may be implemented in both software and hardware is illustrated in concert with other components of an Addibot 101C.

In some examples, the artificial intelligence processing system 102C may be incorporated within the navigation, control, and sensing system 130C or as illustrated it may work in concert with the navigation, control, and sensing system 130C routing data along a bus between the controllers in the navigation, control, and sensing system 130C and the artificial intelligence processing system 102C. In such an example the data flows within the mobile additive manufacturing system 103C-107C may be routed through the artificial intelligence processing system 102C as illustrated or there may be parallel systems which route the data in parallel to the standard navigation, control, and sensing system 130C as well as the artificial intelligence processing system 102C. The nature of data flow and signal feedback between an artificial intelligence processing system 102C create new examples of the mobile additive manufacturing system architecture with new aspects of drive system 120C, navigation, control, and sensing system 130C, additive manufacturing element 140C, material storage system 150C, vision system 160C, and communication system 180C. Each of these systems may perform differently in concert with an artificial intelligence processing system 102C.

For example, a vision system 160C tied to an artificial intelligence processing system 102C may use various machine learning and artificial intelligence algorithms, hardware structures and the like to improve effectiveness in various aspects of vision system performance. Trained artificial intelligence processing systems may recognize defects, structures, and other aspects of a surface such as a roadway that will be processed with additive manufacturing. The system may have as an equivalent to "motion decoding" specific interlocking of both an altered navigation, control, and sensing system 130C which may control the drive system 120C as well as simultaneous interlocking with an altered additive manufacturing element 140C. The system may also interlock with aspects of the vision system 160C where the vision system inspects the result of the additive manufacturing process and provides learning feedback which may trigger aspects of reward evaluation in the artificial intelligence system and foster improved "learning" of the system in the field and "on the fly".

Referring now again to FIG. 1A, an additive manufacturing element 140 may be represented. The various techniques known in the art may be included as an additive manufacturing element including, for example, extrusion heads, stereolithography processing heads and material printing heads. An altered version of stereolithography may occur by the application of thin films of liquid material upon the surface which is then subsequently processed to create hardened surfaces. If the unreacted material is removed a subsequent application of liquid reactant can begin to build the next layer.

The material printing heads may have a wide diversity in characteristics. Printing heads with very fine resolution may be utilized. In other examples larger volumes of material may be printed with heads that have gross resolution. As an example, a printing head may have rows of print heads that have an orifice size such that a roughly millimeter sized droplet may be formed. Such a droplet may have a volume of roughly 10-100,000 times that of a droplet from a 1:1000 resolution. The volume of a millimeter diameter droplet may have an estimated volume of about 0.4 microliters.

In some examples, the additive process can relate to an element such as a print head depositing droplet of material over the surface to build structure. In stereolithography, an energy source is used to convert the liquid to a solidified material, but in these other examples, the droplets of material may either react with the surface or solidify by other principals such as by cooling for example. Combinations of droplets of different material may also result in reactions that result in solidified material.

The additive manufacturing element may also function to add material that changes color or pattern or other physical properties in select regions. A version of this type of additive manufacturing may occur when powders are deposited in the additive process. The powder may create lines or other demarcations. In some of these examples, a subsequent sealing of the powder form may be deposited by another additive manufacturing process.

In some examples, the additive manufacturing element may be an energy source such as a laser, ion beam or the like. The energy source may be used to cause liquid material to solidify in defined regions. The liquid material may be added by the Addibot or be present by other means. As an example, an Addibot may ride upon a transparent surface that may sit above a liquid reservoir of relatively arbitrary size. An Addibot with a laser may ride upon the transparent surface and irradiate the surface layer of the reservoir in desired locations. After a layer is processed, the work material beneath the transparent surface may be moved away from the transparent surface by a layer thickness and the Addibot may again move around on the transparent surface irradiating through the surface to image polymerizable material beneath.

The various additive manufacturing elements that may be used in these manners comprise the art that is consistent with mobile automated additive manufacturing.

An additive manufacturing element 140 may be part of the mobile additive manufacturing system. There may be numerous types of additive manufacturing elements consistent with this type of system. For example, in some examples, the material to be added may be found in a liquid form either in its nascent form or in a processed form. The liquid material may be processed by droplet ejection printing schemes. Some printing elements may be comprised of MEMS jet printing elements. In other examples, the printing element may be composed of an array of valves that open and close to dispense controlled amounts of the liquid. In still further examples, a liquid stream may be controlled by the presence of mechanical shunts which do not allow a stream of the liquid to be released below the element. In fact, any liquid control mechanism, typically deployed in an array of elements, which may allow for a spatial control over the dispensing of the material, may comprise an additive manufacturing element for liquids in a mobile additive manufacturing system.

For the purposes of seal coating, painting and generalized material dispensing on a surface, the additive manufacturing system may be configured with a rotatable spray head system with various spray heads on a supporting bar or other holding shape that can be rotated around a central point. Referring to FIG. 1D, an exemplary rotating spray system 101D is illustrated. A rotational gantry 102D may provide for both rotational motion and the coupling of material feed systems through a rotary gland that may also feed electrical signals, compressed air, vacuum, and the like. The system may have numerous spray dispensing nozzles, which in this case are illustrated by nozzles 103D, 104D and 105D. More dispensing nozzles or fewer may be employed.

Figure 1E:
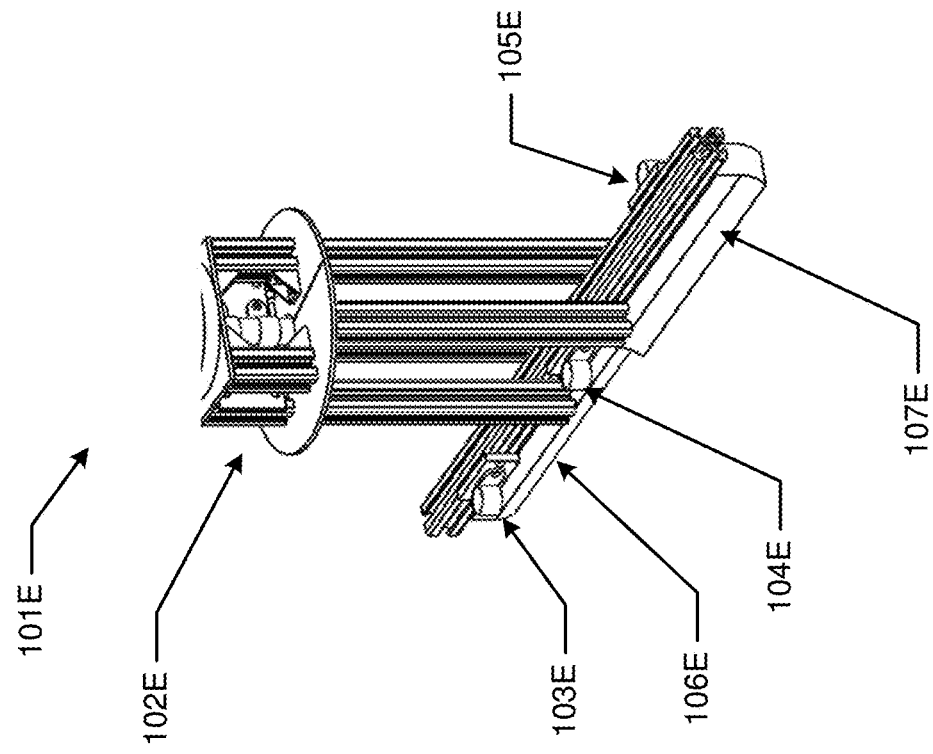
FIG. 1E illustrates an exemplary squeegee dispensing and application system.
Figure 1D:
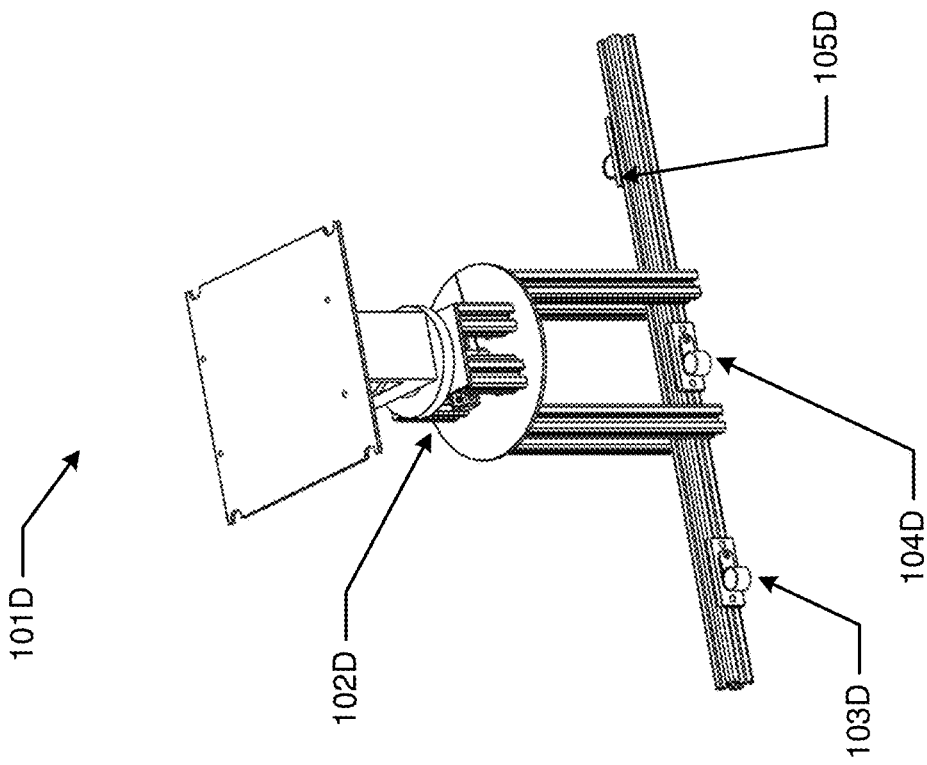
FIG. 1D illustrates an exemplary rotating spray dispensing system.

An alternative example may be found by referring to FIG. 1E, where an exemplary rotary dispensing system is illustrated. A squeegee based rotary system 101E is illustrated with an associated rotary gantry 102E that may also include function for physical rotary motion as well as facilities to pass materials, signals, vacuum, and gas through the rotary process. In the examples, three dispensing heads 103E, 104E and 105E may spray or drip material onto the surface while rotary blade or "squeegee" type elements 106E and 107E may move the material in a rotary fashion. The rotary system may have a split in the center which is why there are two squeegee type elements 106E and 107E which may drag in different directions due to the rotary motion. The blades may be solid structures as illustrated or may be split with multiple blade fingers interfacing with the surface. In some examples a cavity within the squeegee blade may be used to dispense material between the blade fingers and onto the surface. There may be sensors located within the cavity to measure amounts of material and other aspects of the material including temperature. These sensors may generally be located on both illustrated systems in FIGS. 1D and 1E. Components from these systems such as the spray heads, drip heads, squeegee blades, sensors may be made to be easily replaceable, and in some examples the entire rotary arm may be replaceable.

Referring again to FIG. 1A, a material storage system 150 may be found. As has been described there may be numerous types and forms of material that may be processed by an Addibot. In some examples, materials in filament form may be used; in other examples liquids of various kinds may be employed. And, in still further examples, solids such as powder form materials may be utilized. In each of these cases, there may be numerous material options within a particular kind. There may be standard ABS plastic filaments or other plastic filaments. In some examples, other fibers such as fiber class filaments may be utilized in composite processing such as with epoxy resin combinations with fiberglass filaments. In the liquid form a great diversity of materials may be used including resins, photoactive and thermos-active materials. Other materials in the liquid form may be a solid at an ambient condition but may be processed by the additive manufacturing system at conditions that make the material liquid. The powder form examples may be thermo-active and photoactive materials or alternatively may be materials that in combination with other deposited materials cause a reaction to occur resulting in a deposited solid material. In the state of the art, metals, insulators, and ceramics to name a few materials may be formed by the processing of powder form materials. In other examples, the powder deposited will remain in a powder form on the surface.

In the various materials examples that may be possible with an Addibot, the environmental storage conditions on the Addibot may be important. Accordingly, the material storage system 150 may have controls over numerous environmental conditions such as the temperature of the material storage, the pressure, the ambient gasses or a vacuum condition and the humidity to mention some examples. Thus, the material storage system for an Addibot would have control systems for the important environmental conditions. The storage system would need to allow for the automated or non-automated replenishment or replacement of the material that is located in an Addibot. In some examples various combinations of multiple material storage systems may be present. For example, a powder storage system and an additive manufacturing element for powder forms may be combined with a liquid storage system and an additive manufacturing element for liquid forms upon the same Addibot system. In still further alternative, two different forms of material may be combined with different storage systems that feed a single additive manufacturing element that is designed to simultaneously process the two material types.

Other examples may have additive manufacturing elements to disperse solids. The element may extrude elements of material that may be gelled to allow for the material to be formed by the additive manufacturing head. The extrusion elements may also deposit small pieces of extruded material that is in a gelled or partially melted form. Lasers or other high energy sources may cut the small pieces from the extrusion print head as it is being extruded. In other examples, the material is not cut as it is formed into three dimensional shapes. The material storage system may store and process pavement sealant. In some examples, pavement sealant may be continuously filtered and circulated from the storage element through a pumping element. During use some of the pumped sealant may be distributed.

The various materials that are added to the surface may be further treated to form a solidified surface. In some cases, materials may be treated with light or other energy to heat or otherwise react the materials to form a solidified result. In other cases, a chemical reaction may be caused to occur by the addition of a second material. In such cases the additive manufacturing element may be comprised of control elements to disperse liquids and solids or multiple liquids. In addition, the system may include the elements to post process the material such as by thermal or photochemical action. These post processing elements may be located on the additive manufacturing element or may be located in other portions of the system. In some examples, the post processing may also include processes to wash or clear the surface from materials that are not solidified, adhered, or attached to the surface. These processes may include processing to remove solid, powder or liquid material remaining on the work surface such as vacuuming or sweeping. The removed material may be recycled into the material storage system or may be moved to a waste receptacle. In similar fashion the post processing steps to remove material may be performed by elements that are included on the additive manufacturing element or additionally be other elements that are included in the mobile additive manufacturing system.

The results of the various additive processes may be measured by various manners to verify the conformity of the result to a modeled surface topography. An inspection system or a vision system 160 may perform these measurements to control the results. In some examples, the surface may also be studied with a similar or identical metrology element to determine the presence of topography. Another way of looking at such a measurement before the additive manufacturing step may be to examine the surface for defects, cracks or fissures that may need to be processed to form a flat surface for example. Therefore, the vision system 160 may in fact occur multiple times in the system. A pre-measurement may be performed by a first measurement element and a post processing measurement may be performed by a second measurement element. There may be numerous manners to measure the surface topography. As an example, a light or laser-based metrology system may scan the surface and analyze the angle of reflected or scattered light to determine topography. Similar scanning systems based on other incident energy like sound or electromagnetic signals outside the visible spectrum like infrared or UV radiation, for example, may be used.

A different type of metrology system may result from profilometry where an array of sensing elements may be pulled across the surface and be deflected by moving over changes in topography of the surface. An array of deflecting needles or stylus may be dragged over the surface. In an alternative example, a pressure sensitive surface may be pulled over the surface under study.

The surface that the mobile automated additive manufacturing system acts on may have movable defects that exist on it. This may be commonly classified as dust or dirt for example. An element for preparation of the surface 170 may be located in an Addibot. In some cases, the material may be removed by a sweeping or vacuuming process that moves the particles into a region that removes them from the surface. Other methods of removal, which may replace or supplement the sweeping or vacuuming, may include pressurized gas processing which may "blow" the surfaces clean. There may also be electrostatic processes which charge the particles with electric charges and subsequently attract them to charged plates which attract the particles away. A cleansing process may also comprise a solvent based cleaning process which may subsequently be removed in manners mentioned earlier, in a combination of the Addibot techniques. A first Addibot may function to pretreat a surface in a variety of manners while a second Addibot performs a topography altering additive manufacturing process.

Another element, a communication system 180, of the mobile additive manufacturing system may be found referring to FIG. 1A. In general, Addibots may be used in combinations to perform functions. To effectively perform their function, it may be important that the Addibots may be able to communicate with each other. The communication system may also be useful for communication between the Addibot and a fixed communication system. The fixed communication system may be useful for communicating various data to the Addibot as well as receiving data transmissions from the Addibot. The data transferred to the Addibot may include programming software or environmental target files or the data may include environmental data such as mapping data or topological data as examples. The communication may be carried by RF transmission protocols of various kinds including cellular protocols, Bluetooth protocols and other RF communication protocols. The communication may also utilize other means of data transfer including transmissions of other electromagnetic frequencies such as infrared and optical transmissions. Sound waves may be useful for both communication and spatial mapping of the environment of the Addibot. In some examples the Addibot may be tethered to at least a communication wire that may be useful for data transmission.

Another form of communication may relate to visual based information conveyed by the Addibot body itself. In some examples, the Addibot body may include a display screen to communicate information to the surroundings in the form of graphic or visual data. As an example, the display can warn people in the environment of the Addibot as to the function that the Addibot is performing and when and to where it may move. Audio signaling may comprise part of the communication system in addition. As well, the Addibot may be configured with a light system that can project visual signals such as laser patterns, for example.

The communication system may be useful to allow external operators to provide direction to the Addibot. The directions may include the control of navigation in both a real time and a projective sense. Users may utilize the communication system to provide activation and deactivation signals. Numerous other functional control aspects may be communicated to control operation of the Addibot other than just the transfer of software programs including for example activation and control of the various subsystems.

A Power and Energy storage element 190 may be found within the mobile additive manufacturing system. In some examples, an Addibot will be tethered with a wire. The wire may be used for a number of purposes including providing power to the Addibot drive system or to an energy storage system within the Addibot. In many examples, the Addibot will operate in a wireless configuration, and therefore, will contain its own power system in the mobile platform. Standard combustion engines and hydrocarbon fuels may comprise a power system along with a generator driven by the engine to charge batteries as an electric charging system. In other examples, a battery powered system may power both the drive system with electric motors as well as the electronics and other systems. The battery storage system may be recharged during periods of non-use and the components of such a recharging system may comprise portions of the power and energy storage element. In some examples where the Addibot operates in an automated fashion, the recharging of the energy storage element may also occur in an autonomous fashion whether it is recharging electrically or obtaining additional fuel stores.

There may be numerous manners to configure the novel mobile additive manufacturing system that has been described. In the following examples, non-limiting examples are provided as examples of the different manners that the Addibot apparatus type may be utilized.

Road Surface Treatment—Sealcoating and Line Painting

One manner that an Addibot may be configured to perform is processing that observes a local surface topography and adds material to make the surface flatter, or to replace surface material that has been lost to erosion or other subtractive influences over time. Cracks, fissures, divots, and other local changes to a surface flatness may also be processed by adding an appropriate material either to fill in the cracks and fissure or otherwise reshape the surface topography.

Roadway infrastructure includes many surfaces, consisting of a variety of different materials, that may be subjected to constant eroding or otherwise deteriorating forces that create defects in the surfaces over time. Some non-limiting examples may include frost-heaving, where water that has seeped underneath a road bed or into existing cracks, fissures, or other defects freezes and expands with considerable force, exerting significant strain and stress on the surface material; the stress may even surpass the allowable stress for the material, creating new defects in the surface or worsening existing defects. As a destructive process, frost-heaving may be thought of to have a kind of momentum in destroying a roadway surface—existing cracks form a perfect collection area for more water, which then expands and makes the cracks even larger; the larger the crack, the easier it is for frost heaving to move more material and make the crack larger, eventually forming it into a pothole and possibly creating new cracks. Constant preventive maintenance is a strategy that may be described as counteracting this destructive process' momentum by eliminating the causes of the process (existing defects where water can collect and contribute to frost-heaving, as a non-limiting example) before they allow the process to build momentum. Large potholes may be not only more susceptible to frost-heaving in certain areas, but also more costly and difficult to repair successfully than small cracks; since potholes won't form unless there are cracks for them to form from, if effort is focused on repairing defects when they are small and manageable, these defects will never form into costly potholes, and a better quality of road is achieved at lower cost and lower effort than waiting to repair the potholes when they become a problem for vehicles using the roadway.

One non-limiting example a of constant preventive maintenance process for roadway surfaces is called sealcoating. With sealcoating, a liquid asphalt emulsion with possible additives like sand grains, as a non-limiting material example, may be sprayed or spread, as non-limiting application method examples, onto a roadway surface. The emulsion may spread into and around cracks and other roadway defects, sealing and repairing these defects. The applied material also creates a layer of material on top of the previously existing surface. This may create a flatter surface that is more resilient to wear and tear from vehicles driving on the surface, as well as a buffer that adds life to the surface against forces that remove material from it—these forces must remove the newly added material first before they can remove material from the structural layers of the roadway. Because sealcoating may be much easier and cheaper than processes to repair larger defects or to create the roadway itself, utilizing this method regularly can extend the lifespan of a road at much lower cost than other methods.

Existing sealcoating methods often include numerous processing steps that are manually guided by roadway workers. These steps may include, as common non-limiting examples, directing a spray wand over the roadway surface that sprays the emulsion onto the surface. Another common non-limiting example may include directing squeegees or brushes to spread a viscous emulsion evenly over a roadway surface. Because these methods are manually directed, they may be directed by a combination of human eyes and hands. Sealcoating processes may be successful in repairing roadway surfaces by covering the entirety of the road surface, preventing any individual point of the roadway surface from becoming a node for erosion that spreads throughout the rest of the roadway surface; manually directed methods for sealcoating may suffer from the inherent imprecision of human eyes and hands, resulting in the failure of an otherwise successful sealcoating operation due to the workers missing one or a few spots over the entire road surface that form spreading defects and ruin the roadway surface over time. Additionally, since common sealcoating processes may involve countless manual steps, each of which may be tedious, repetitive, and laborious, a worker completing these steps may inherently fatigue over time, mentally and/or physically, comprising the quality of their work over time.

Because of these limitations regarding current manually operated processing steps, it may be highly desirable to utilize the precision and efficacy of Addibots in conducting sealcoating operations. Addibots configured for sealcoating may utilize a combination of computer vision and other possible visual sensors, robotic mobility, and actuated automation that replace these possible afore-mentioned manually operated processing steps with significantly improved quality. Repetitive processing steps of the sealcoating operation may also be completed by the automation and systems combination within the Addibot configured for sealcoating, rather than the human worker who may be directing the operations of the Addibot in the non-limiting example where the Addibot is directed; an Addibot that may be completing these repetitive steps may not fatigue like a human worker may over the course of the sealcoating operation, and thus quality may remain consistent throughout. There may be numerous additional advantages, beyond what has been already discussed, to using an Addibot configured for sealcoating, that may be discussed below.

Figure 2:
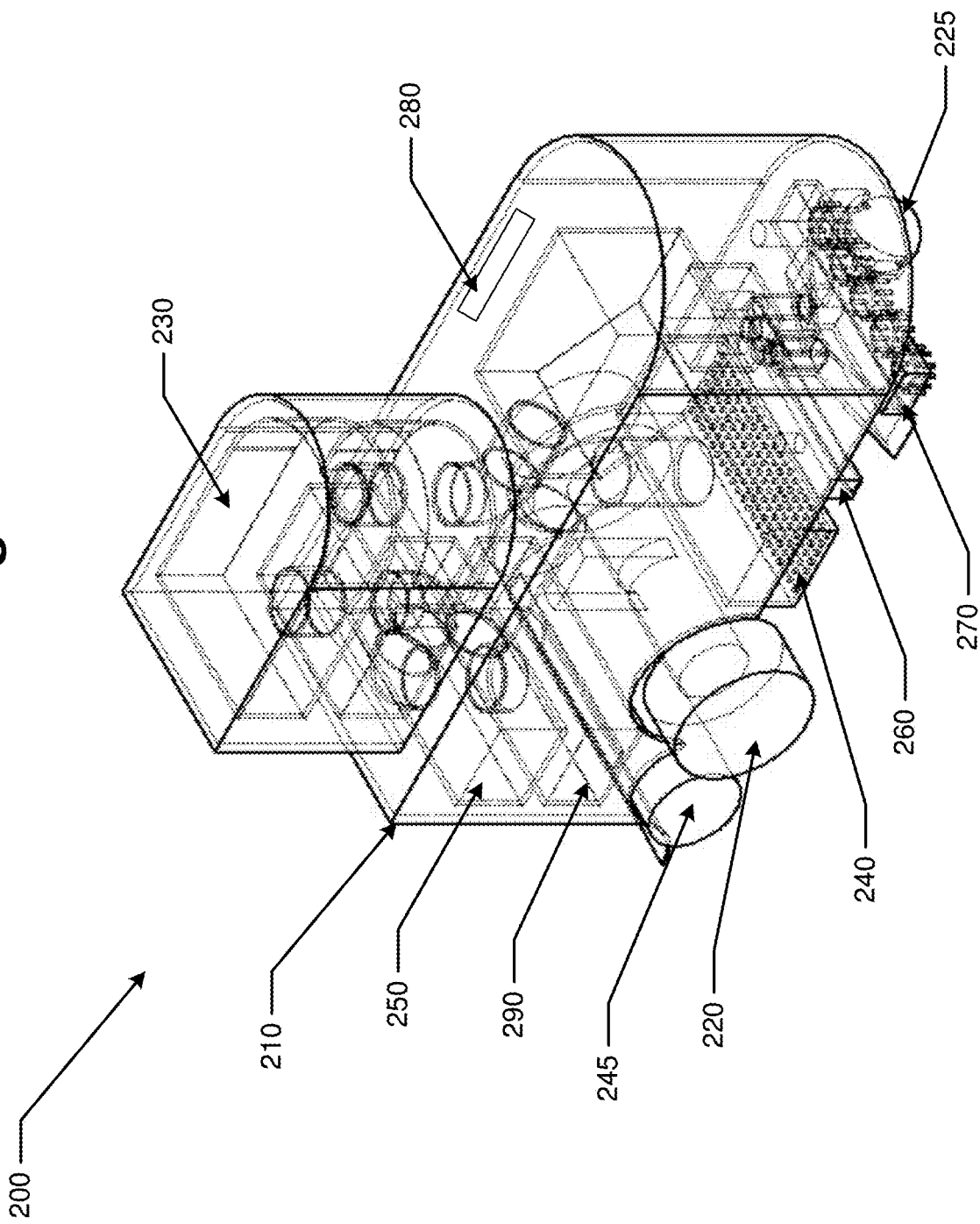
FIGS. 2 and 2B illustrate perspective views of an exemplary mobile automated additive manufacturing apparatus that may be useful for Road Surface Treatment.
Figure 2B:
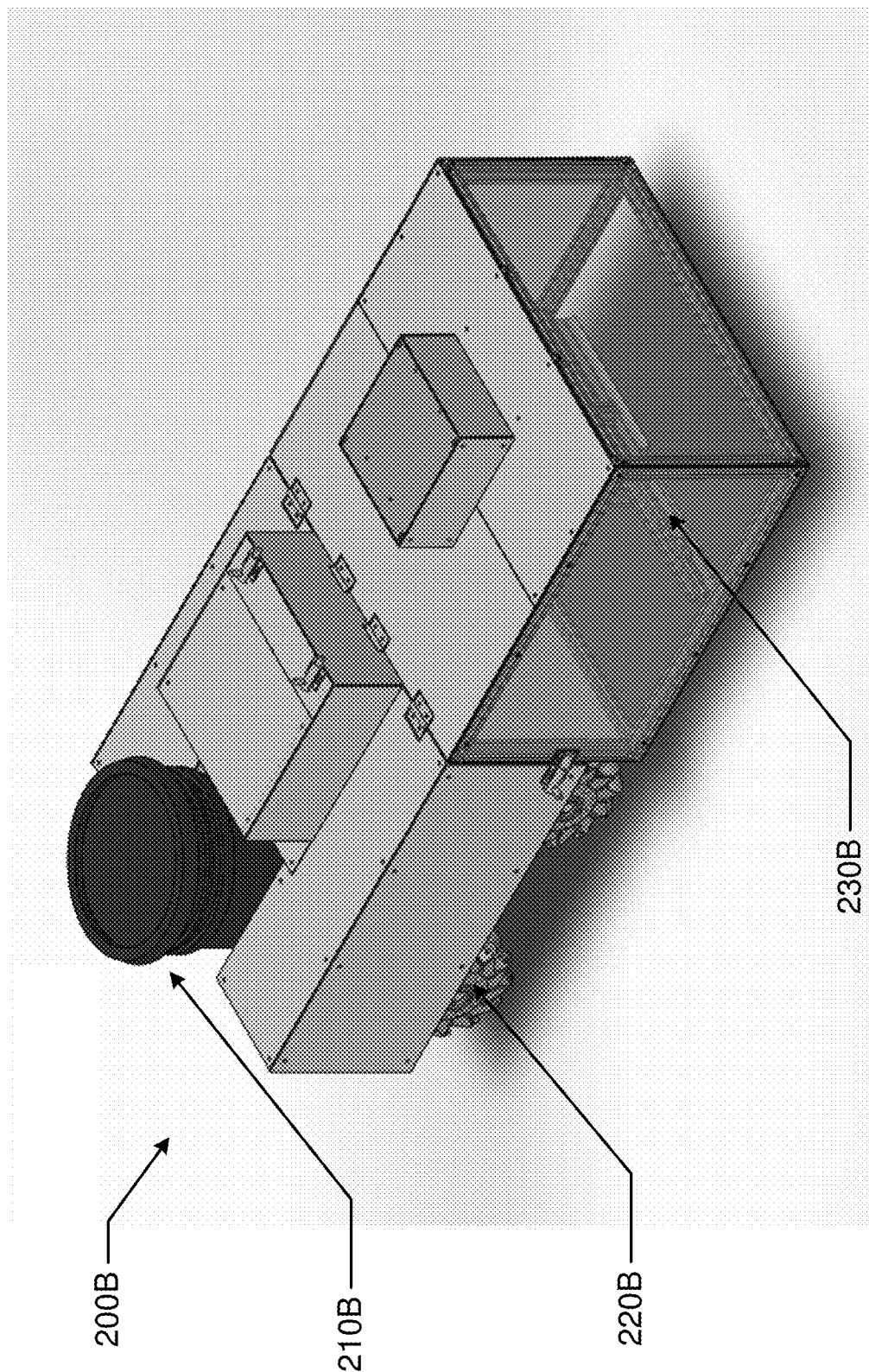

Referring to FIGS. 2 and 2B examples of a generic mobile additive manufacturing system in FIG. 2 item 200 and an exemplary tailored sealcoating system in FIG. 2B are illustrated. The various components of FIG. 2 may be included in the system of FIG. 2B and may not be illustrated or visible. Nevertheless, we will discuss the two examples in tandem. For example, at item 200B an example of an Addibot configured for sealcoating may be found. Those systems and aspects that may be present in an example of an Addibot configured for sealcoating may be referred to with their reference from FIG. 2. The chassis 210 of the Addibot may contain and support the systems of the Addibot in a mobile and autonomous manner.

The drive system may have a specific set of embodiments for omnidirectional drive illustrated in FIG. 2B as the drive flexible wheel 220B. The depiction in FIG. 2 provides an example of one possible drive system 220 using three wheels with a rotating front wheel 225 whereas the depiction in FIG. 2B depicts a four-wheel example in this case with omnidirectional drive components. An example using different number or type of wheels may also be within the scope of the inventive art herein.

An alternative non-limiting example of a possible drive system may include an omnidirectional drive system utilizing Mecanum wheels. Mecanum wheels may consist of multiple specialized rollers arranged on specialized hubs that orient the axis of rotation for each of the rollers at 45 degrees with respect to both the plane of the wheel as well as the axis of rotation of the wheel. As a result, the rollers may individually rotate as the wheel spins; by coordinating the relative rotation speeds and directions of each of the four individual Mecanum wheels, different directions of linear or rotational movement may be achieved with high precision. This may include linear movement at any or many possible angles with respect to the center of mass of the apparatus. This may also include turning with no turning radius, allowing for full rotational orientation of the apparatus at any angle of rotation with respect to the center of mass of the apparatus. If these two characteristics are combined in a drive system, the exemplary drive system may be able to move in a particular linear path over a surface while, at the same time, changing its rotational orientation.

The drive system may be constructed, though, in a manner in which it does not interact with the other Addibot systems, for example, the vision system or the additive manufacturing element system. Depending on how the wheels of the drive system are powered, they may also be part of the navigation, control, and sensing system. Based on the input from the vision system (as a part of the navigation control and sensing system) the wheels may direct the Addibot to its desired path, in a fashion that is either autonomous or predetermined, depending on the orientation and number of the wheels.

A sensing element 230 may be depicted. This element may be used to perform functions necessary in the navigation, control, and sensing system for this example. The navigation functions could be performed through GPS, an element grid, or other manners as has been described relating Navigation, Control and Sensing system 130 of FIG. 1.

An additive manufacturing element 240, and a secondary additive manufacturing element 245 for this example may be shown. The additive manufacturing element 240, for this example, may be a material printing head, as described in reference to the additive manufacturing element of FIG. 1, which may dispense droplets of sealcoat emulsion of a controlled size, as well as a controlled temperature (which may be controlled by the material storage systems). This element may function to execute a precise additive process of the material, based on input from the vision system. Another element, in this example, the secondary additive manufacturing element 245 may be a roller or other type of distribution apparatus that spreads or smoothens to a degree material that was added to the surface. In the alternative example in FIG. 2B, the additive manufacturing system 230B may include a spray bar with a squeegee applicator.

In certain non-limiting examples of an Addibot configured for sealcoating, a distribution system comprising at least an additive manufacturing element 230B may be fixed to the chassis 210 but positioned and operant outside of the area between or under the components of the drive system. Utilizing a drive system 220B with Mecanum wheels, as a non-limiting example, this distribution system may be guided in a particular path over a surface that allows this distribution system to cover the entire surface it is passing over, without the area between or under the components of the drive system ever passing over any area that was already distributed upon.

Elements of a material storage system 250 of this example are shown. These components may comprise various elements that may be necessary for material storage within an Addibot. There may be numerous alternative designs and orientations of components that may be consistent with the function of an Addibot. In the example of FIG. 2B, a primary material reservoir 210B where sealcoating emulsion mixtures may be contained, may be filled by an operator of the Addibot apparatus. Some non-limiting examples of sealcoating emulsion may include a water-based rubberized asphalt mixture, a coal-tar based mixture, or acrylic based mixture, all of which may be commonly used in practice for various reasons of applicability or environmental conditions. For example, ambient temperatures, humidity, and sun may allow for a water-based mixture to set well on a certain driveway, which may make it preferable to other mixtures for which the typical of conventional application methods might be more difficult or imprecise. These different non-limiting examples of mixtures may also comprise different additives that contribute to added abrasion resistance, improved adhesion, or other desired aspects. Some non-limiting examples of commonly used additives may include sand or other finely ground stone aggregates, polymers or other synthetic materials, coloring chemicals, among others.

Recirculation of sealcoating emulsion during the surface preparation may also be directed to the primary reservoir. Typical sealcoating emulsions may comprise mixtures of many different materials. Over time, if they are not mixing or moving through a processing/application system, these mixtures may settle and separate into layers of their discrete components. Naturally, it may be desirable for an emulsion mixture to be well-mixed so that the applied material consists of a uniform mixture of all the materials in the sealcoating emulsion. To achieve this mixing, a material storage system 250 may have pumps or other components that cycle material through the system at pressure, to mix the material. Typically, two or more cycles through the material storage system 250 may be enough for standard-grade sealcoating emulsions, but other parameters may be defined for what is considered adequate mixing of the sealcoating emulsion. Physical mixers like an auger, paddles, or other such devices may also be used to mix up the sealcoating emulsion used in an Addibot configured for sealcoating. An environmentally controlled secondary material reservoir may also be used to keep sealcoating emulsion mixtures at a different storage condition than that used in the primary storage location, such as the temperature, pressure, or other characteristic of the material.

The primary vessel containing the material for dispensing may be replaceable on the Addibot and the primary material reservoir 210B may represent a bucket of material that in some examples may be procured direction in that form. In other examples large collections of material may be used to fill and refill the primary material reservoir. In examples of where the primary material reservoir 210B may be a bucket purchased in the used form, the interface of the bucket may include a system which replaces the top of the bucket, or alternatively may include a portion of the bottom of the bucket which may allow for connection and interface of the material of the bucket to the systems of the mobile additive manufacturing system.

A vision system 260 which may be hidden but present in FIG. 2B as well, for this example may be depicted as shown. This element may use a variety of methods such as those described in reference to vision system 160 of FIG. 1A. These may include a laser scanner, sensitive extruding pins or brushes, or such components as may allow for inspection of the surface to be process or for determination of the topography of the surface. Alternative orientations may be possible including for example an orientation where a vision system may be placed behind the additive manufacturing element to perform a post-inspection of the surface, after the material has been applied. Among other purposes, the inspection may be used to verify the results of the addition process and to see if more or less material may need to be added.

A surface preparation system 270 for this example may be observed. In this example, it may be necessary to remove dust, dirt, asphalt, rocks, or other debris from the road surface before it may impede the accuracy of the vision system in processing the surface topography. The elements shown in FIG. 2 may include a brushing system, a vacuum system, and a scraping system or a combination of these.

These systems may be used to remove undesired particles from the surface. Other particle removal systems, including ionizing plates, a sweeping broom, or other brush-based devices, other types of vacuums or suction devices; high pressure gas or liquid treatments to blow surface debris clear of the surface or into a collection region, among other systems may also be usable for this example of an Addibot.

A communication system element 280 for this example may be seen. This element may be used to carry out communication processes, either between other Addibots or an external user. These tasks may be carried out in manners consistent with methods described in reference to the communication system 180 of FIG. 1A.

A power and energy storage system 290 may be depicted. This element may be a battery to power the example's electrical systems and motors, or a combustion engine to power the drive system which may also charge a battery system as non-limiting examples. The power system may provide mechanical energy to the drive system or may provide electrical energy to the drive system which may power engines that comprise portions of the drive system. Electrical energy from generators connected to combustion engines or from battery sources may be used to power substantially all of the electronic systems utilized throughout an Addibot. Other energy storage sources such as compressed air may also comprise acceptable solutions for energizing the operations of an Addibot.

Some or all of the elements illustrated in FIG. 2 may be present in the systems of the example of FIG. 2B.

Communication to the control systems may be performed by wireless communication protocols such as Wi-Fi, Bluetooth, cellular communication protocols such as gsm, CDMA for example, and operate on different communication channels and frequencies as have been discussed. Additionally, Addibots of various types may also comprise connections for wired communication and also display screens and input/output devices to allow operators to provide control signals, data transmission and other interaction with the Addibot.

The various systems of Addibots may necessarily utilize materials or other commodities such as energy during the course of processing. The material storage systems may interact with fixed units that may refill them, or they may be filled by operators in a manual fashion. In the example of a sealcoating Addibot the material storage system may be refilled with sealcoat emulsion for example.

In examples that utilize batteries as a power source, the batteries may be powered at a charging station. The interaction of the Addibot with a charging station may be performed in an autonomous fashion where the Addibot moves itself into a proper location to interface with the charging station. Alternatively, an operator may interact with the Addibot and connect it with a charging system.

Control Systems

Figure 3:
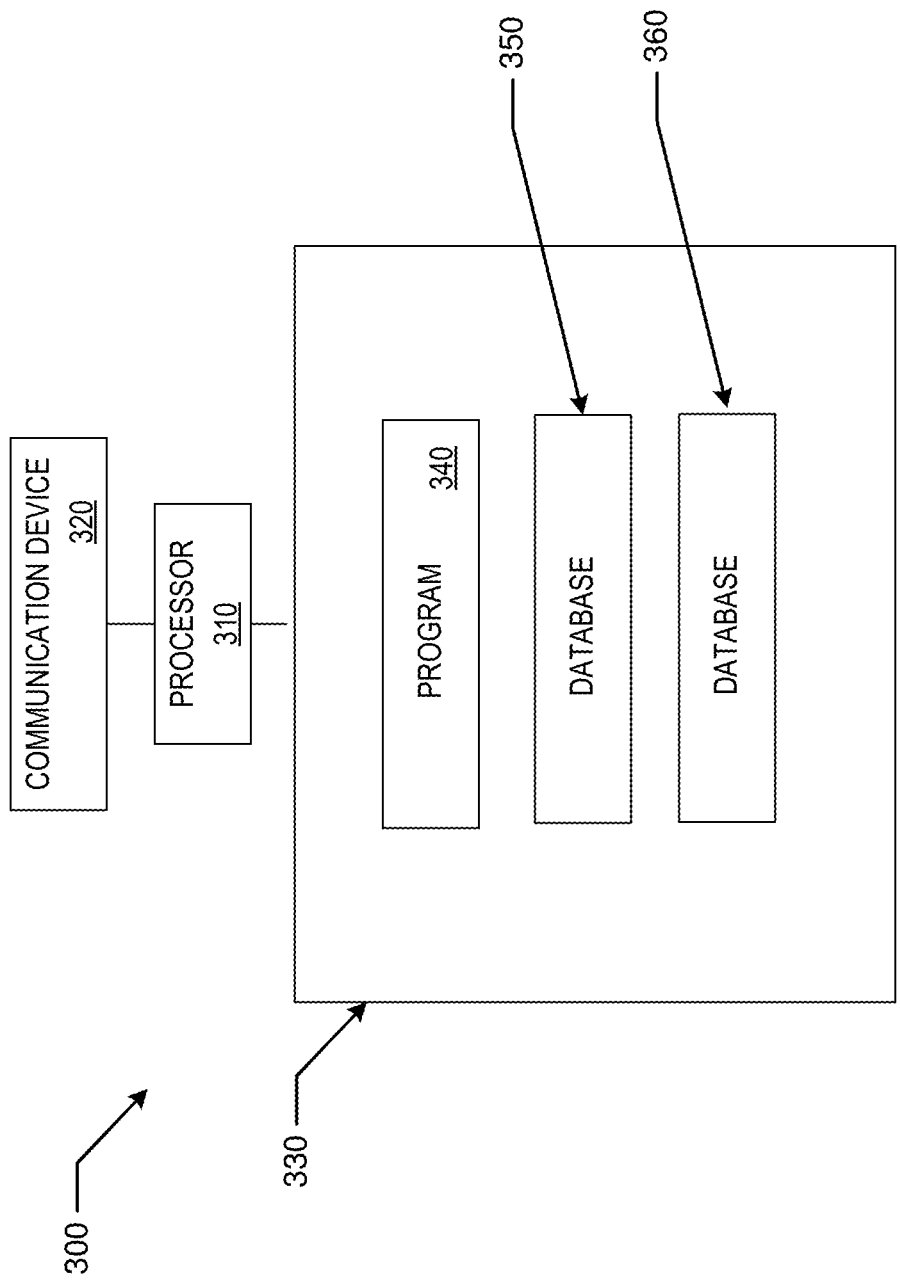
FIG. 3 illustrates a processor and controller that may be useful in various examples of mobile automated additive manufacturing apparatus.

Referring now to FIG. 3, a controller 300 is illustrated that may be used in some examples of a mobile additive manufacturing apparatus. The controller 300 includes a processor 310, which may include one or more processor components. The processor may be coupled to a communication device 320.

The processor 310 may also be in communication with a storage device 330. The storage device 330 may comprise a number of appropriate information storage device types, including combinations of magnetic storage devices including hard disk drives, optical storage devices, and/or semiconductor memory devices such as Flash memory devices, Random Access Memory (RAM) devices and Read Only Memory (ROM) devices.

At 330, the storage device 330 may store a program 340 which may be useful for controlling the processor 310. The processor 310 performs instructions of the program 340 which may affect numerous algorithmic processes and thereby operates in accordance with mobile additive manufacturing equipment. The storage device 330 can also store Addibot related data in one or more databases 350, 360. The databases 350,360 may include specific control logic for controlling the deposition of material at each of the additive manufacturing components which may be organized in matrices, arrays, or other collections to form a portion of an additive manufacturing system.

As mentioned in reference to FIG. 1D, an Addibot may benefit from operational incorporation of artificial Intelligence, machine learning and other such operational control aspects. In some examples, the hardware as depicted in FIG. 3 may include hardware and software aspects that support artificial intelligence including as non-limiting examples processors specifically designed to optimize performance of artificial intelligence algorithms, data bus designs to optimize performance between various blocks such as the vision system and controller and associated algorithms.

While the disclosure has been described in conjunction with specific examples, it is evident that many alternatives, modifications, and variations will be apparent to those skilled in the art in light of the foregoing description. Accordingly, this description is intended to embrace all such alternatives, modifications and variations as fall within its spirit and scope.

Methods

Figure 4:
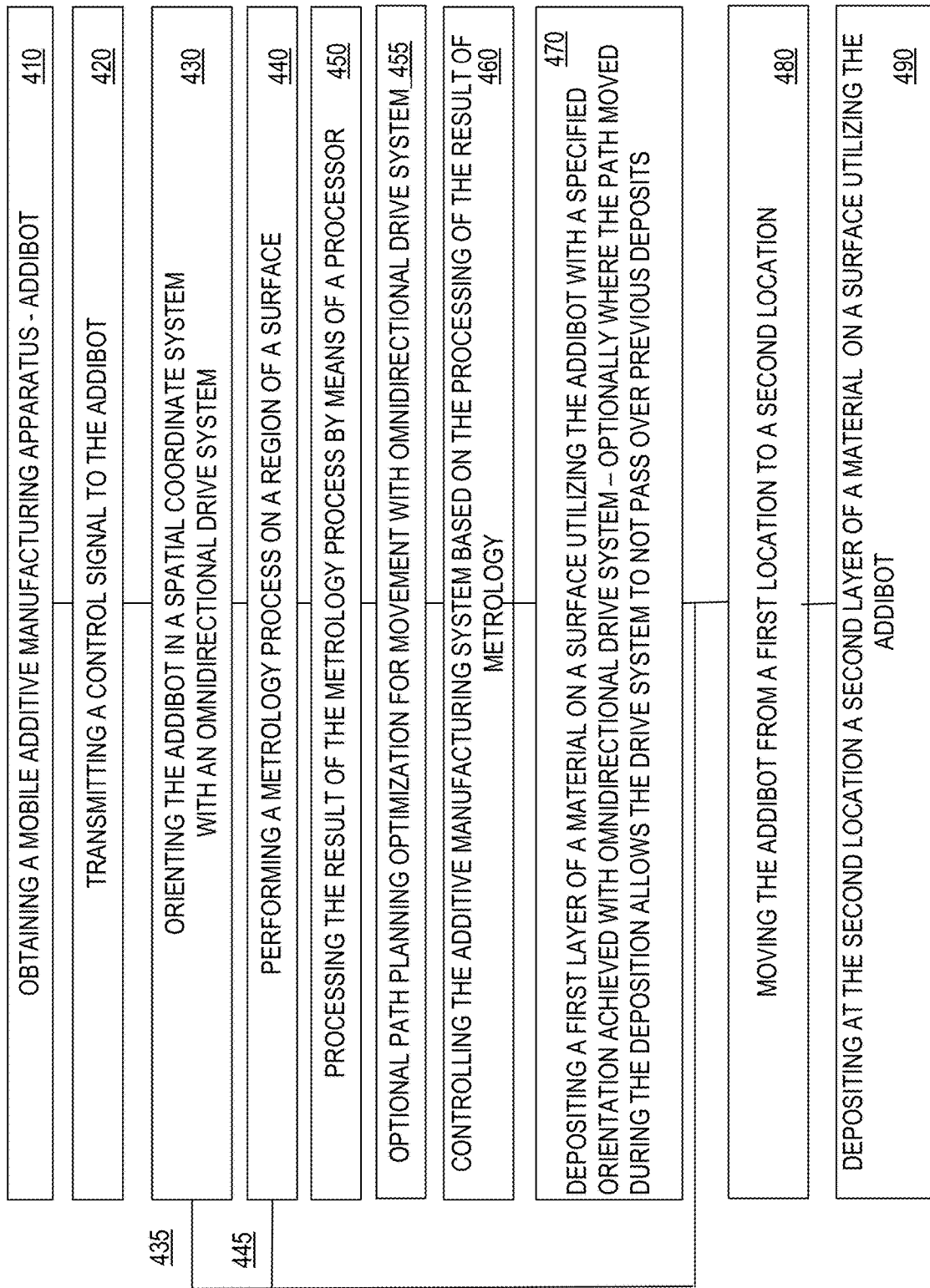
FIGS. 4 and 4B illustrate exemplary methods related to various examples of mobile automated additive manufacturing apparatus.

There may be numerous methods of utilizing an Addibot, manufacturing an Addibot or creating a product with an Addibot. Referring to FIG. 4, an exemplary set of method steps that may be commonly utilized in numerous examples of Addibots are displayed. The steps are displayed in a flow chart for example. The steps may flexibly be used or not used, and the order of the steps may be changed within the scope of the inventive art of Addibots.

At step 410, an Addibot of a particular type may be obtained by a user. Next, at step 420 the user may transmit a control signal to the Addibot. The transmitting may involve numerous means including a wireless transmission, a wired transmission or a transmission involving a physical interaction such as pushing a switch or a display panel of an Addibot. The initiation signal may cause a variety of responses that are proximately caused by the initiation even if further interaction with the user is or is not required or if the Addibot will flexibly respond to its environment or programming thereafter.

At 430, in some examples the Addibot may perform an orientation step. This step may assess one or more of determining a spatial location in a spatial coordinate system and may also assess movement and direction of movement or potential movement in a spatial coordinate system. In some examples, the step may be performed by activating an omnidirectional drive system. This step may include many of the different aspects as have been discussed herein.

At 440, in some examples the Addibot may perform a metrology process on a region of a surface. In other examples at 440 an apparatus external to an Addibot may perform a metrology process on a region of a surface and may communicate information to an Addibot related to the metrology or related to the processing of the metrology data 450 in some form.

Additionally, at 450, in some examples the Addibot may process the result of the metrology by means of a processor. In some examples, the said process may be one as described in FIG. 3.

At 455 in some examples an optional step may involve planning the path of the mobile additive manufacturing apparatus for movement with an omnidirectional drive system. In some examples, the path planning may use hardware and/or software for artificial intelligence or machine learning processing.

At 460, in some examples the Addibot will utilize the information that it has received in various manners about the surface and any desired model that results from this information and based on a digital model provide controlling signals to the additive manufacturing system.

At 470, in some examples, the Addibot will deposit a first layer of material on a surface. The Addibot may be oriented, in some examples, with a drive system that operates as an omnidirectional drive system. In some example the path that the omnidirectional drive system performs may allow the Addibot to deposit while not passing over previous deposits. In some examples, the drive system may perform the ability to not pass over previous deposits with continuous steps which do not reverse direction of the Addibot during the path progression. Continuing at step 470, in some examples, the Addibot will deposit a first layer of material on a surface. In some examples, the first layer of material will be comprised of adhesives or sealers. In some other examples, the first layer of material may be comprised of a mixture of aggregate or small solids and an adhesive or sealing agent. In still further examples, the adhesive or sealing agent may be further processed by exposure to an energy source such as a UV light exposure to initial a polymerization reaction in the material.

At 435, there may be a loop process that occurs in some examples and under some situations that may cause the Addibot to return to step 430 and continue processing. Alternative, in some examples, as shown at step 445 a loop process may occur that may cause the Addibot to return to step 440 and continue processing.

At 480, a step may occur where the Addibot is moved from a first location to a second location. In some examples, a characteristics of this movement is that as part of the Addibot moving the additive manufacturing system as a whole moves from a first location to a second location even if portions of the additive manufacturing system could move some or all of the printing head or other additive element to the same second location without a movement of the Addibot.

At step 490, the Addibot may deposit at the second location a second layer of material. The nature of the second deposit may comprise a different material, or a same material. The nature of the second deposit may comprise a different physical characteristic such as thickness or the same characteristic as a first deposit. The second deposit may be contiguous with a first deposit but be located at a second location and be considered a second deposit, by the very nature of being at a second location.

At step 435, there may be a loop process that occurs in some examples and under some situations that may cause the Addibot to return to step 430 and continue processing. In an alternative example, in some examples, as shown at step 445 a loop process may occur that may cause the Addibot to return to step 440 and continue processing.

Figure 4B:
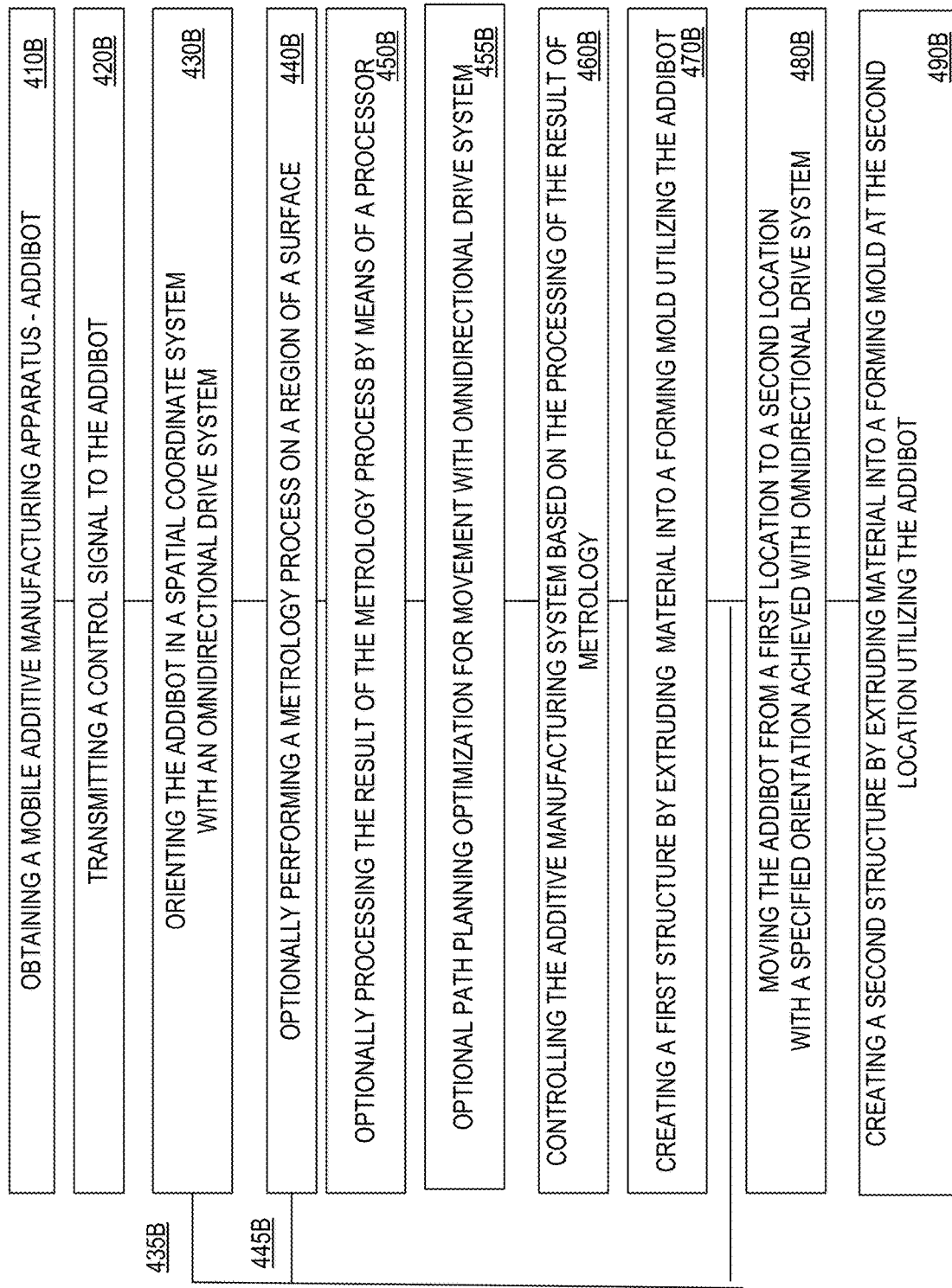

Referring to FIG. 4B, an Addibot of a particular type may be obtained 410B by a user. Next, at step 420B the user may transmit a control signal to the Addibot. The transmitting may involve numerous means including a wireless transmission, a wired transmission or a transmission involving a physical interaction such as pushing a switch or a display panel of an Addibot. The initiation signal may cause a variety of responses that are proximately caused by the initiation even if further interaction with the user is or is not required or if the Addibot will flexibly respond to its environment or programming thereafter.

At 430B, in some examples the Addibot may perform an orientation step. This step may assess one or more of determining a spatial location in a spatial coordinate system and may also assess movement and direction of movement or potential movement in a spatial coordinate system. In some examples, the step may be performed by activating an omnidirectional drive system. This step may include many of the different aspects as have been discussed herein.

At 440B, in some examples the Addibot may perform a metrology process on a region of a surface. In other examples at 440B an apparatus external to an Addibot may perform a metrology process on a region of a surface and may communicate information to an Addibot related to the metrology or related to the processing of the metrology data in some form 450B. In some examples, these metrology steps may involve the measurement of surface topography in such a manner as to allow for the adjustment of the level of a forming mold as it is placed to interact with the surface.

Additionally, at 450B, in some examples the Addibot may process the result of the metrology by means of a processor. The processor may in some examples identify the level of the surface. In other examples the processor may identify the presence of a crack or other defect, determine a need for such a feature to be filled or otherwise have action performed on it, and then establish the location information for the feature detected. In some examples, the detection of a defect may cause the Addibot to send a signal and wait for a user to interact with the Addibot for additional controls.

At 455B in some examples an optional step may involve planning the path of the mobile additive manufacturing apparatus for movement with an omnidirectional drive system. In some examples, the path planning may use hardware and/or software for artificial intelligence or machine learning processing.

At step 460B, in some examples the Addibot will utilize the information that it has received in various manners about the surface and any desired model that results from this information and based on a digital model provide controlling signals to the additive manufacturing system. The controlling signals may cause the Addibot to adjust the level of components within the Addibot; or the level of the Addibot frame itself.

At step 470B, in some examples, the Addibot may create a first structure by extruding material into a forming mold. In some examples, the first layer of material will be comprised of thermoplastics or other extrusion materials. In some examples, the Addibot may fill a portion of the resulting formed structure with wall forming materials such as cement. In other examples, the Addibot may signal the completion of a first structure formation and another device or another Addibot may add wall forming materials to the thus formed structure.

At step 435B, there may be a loop process that occurs in some examples and under some situations that may cause the Addibot to return to step 430B and continue processing. In an alternative example, in some examples, as shown at step 445B a loop process may occur that may cause the Addibot to return to step 440B and continue processing.

At step 480B, a step may occur where the Addibot is moved from a first location to a second location. In some examples, a characteristic of this movement is that as part of the Addibot moving the additive manufacturing system as a whole moves from a first location to a second location even if portions of the additive manufacturing system could move some or all of the printing head or other additive element to the same second location without a movement of the Addibot. Forming mold pieces that may be present in the Addibot may be moved vertically upwards and downwards in the process of readying the Addibot for movement and then preparing the Addibot for a next processing step. The Addibot may be oriented, in some examples, with a drive system that operates as an omnidirectional drive system. In some example the path that the omnidirectional drive system performs may allow the Addibot to deposit while not passing over previous deposits. In some examples, the drive system may perform the ability to not pass over previous deposits with continuous steps which do not reverse direction of the Addibot during the path progression.

At step 490B, the Addibot may create a second structure by extruding material into a forming mold at the second location. The nature of the second structure formed may comprise a different material, or a same material. The nature of the second structure formed may comprise a different physical characteristic such as thickness or the same characteristic as a first deposit. The second structure formed may be contiguous with a first structure formed but be located at a second location and be considered a second structure, by the very nature of being at a second location.

Teams of Mobile Additive Manufacturing Systems

In the performance of sealcoating as a non-limiting example, the rate at which the road surface is processed may be complemented by the concerted processing of multiple Addibots. Referring to FIG. 5 item 500, in some examples, a team of two or more Addibots 510, 511, and 513-515, may process the road surface. In these cases, the Addibots may need to accurately communicate and sense the presence of other Addibots. In some of these examples, the concerted action may also involve processing by an external processing or controlling device 550 that communicates with and to the Addibots. Proximity sensors in the communication or other sensing components may operate as well to establish the presence of obstacles such as other Addibots or humans or other such obstacles that may be present on a road surface. Depending on the maximum amount of material desired for storage on one Addibot at one time, desires to limit the size or discrete throughput of an individual Addibot, or other possible design considerations that might determine the maximum throughput of an Addibot configured for sealcoating, as non-limiting examples, an Addibot may not be able to achieve a throughput to complete a certain sealcoating job in a satisfactory amount of time. Utilizing multiple Addibots configured at a certain throughput may increase the overall throughput by a factor for each Addibot used; two Addibots may complete the job in half the time, three Addibots may complete the job in a third of the time, etc. Teamwork of multiple Addibots may also allow for fewer processing inefficiencies, to streamline progress of a sealcoating job. As a non-limiting example, if an Addibot needs to refill the storage tank of its material storage system, a second Addibot may continue sealcoating while the first Addibot refills its storage tank; the first Addibot may then continue sealcoating, working while the second Addibot subsequently refills its storage tank. Alternatively, a specialized robotic device 540 may function to fill the Addibots with material from a storage tank on the controlling device 550. There may be numerous manners that teams of Addibots may function to sealcoat and line paint a roadway surface or perform other coordinated additive manufacturing processing.

Advanced Roadway Construction with Addibots

Examples of structure building with extrusion components within an Addibot have been described in the recent section. Different versions of extrusion components may be used to construct advanced roadways as well. The use of the term roadway in this disclosure is intended to embrace an inclusive definition as may be standard in the industry wherein a roadway includes the lanes for vehicular traffic, the shoulders along those lanes, medians between on-coming lanes, turning lanes, and margins along the shoulders to separate the roadway from its surroundings.

Figure 6:
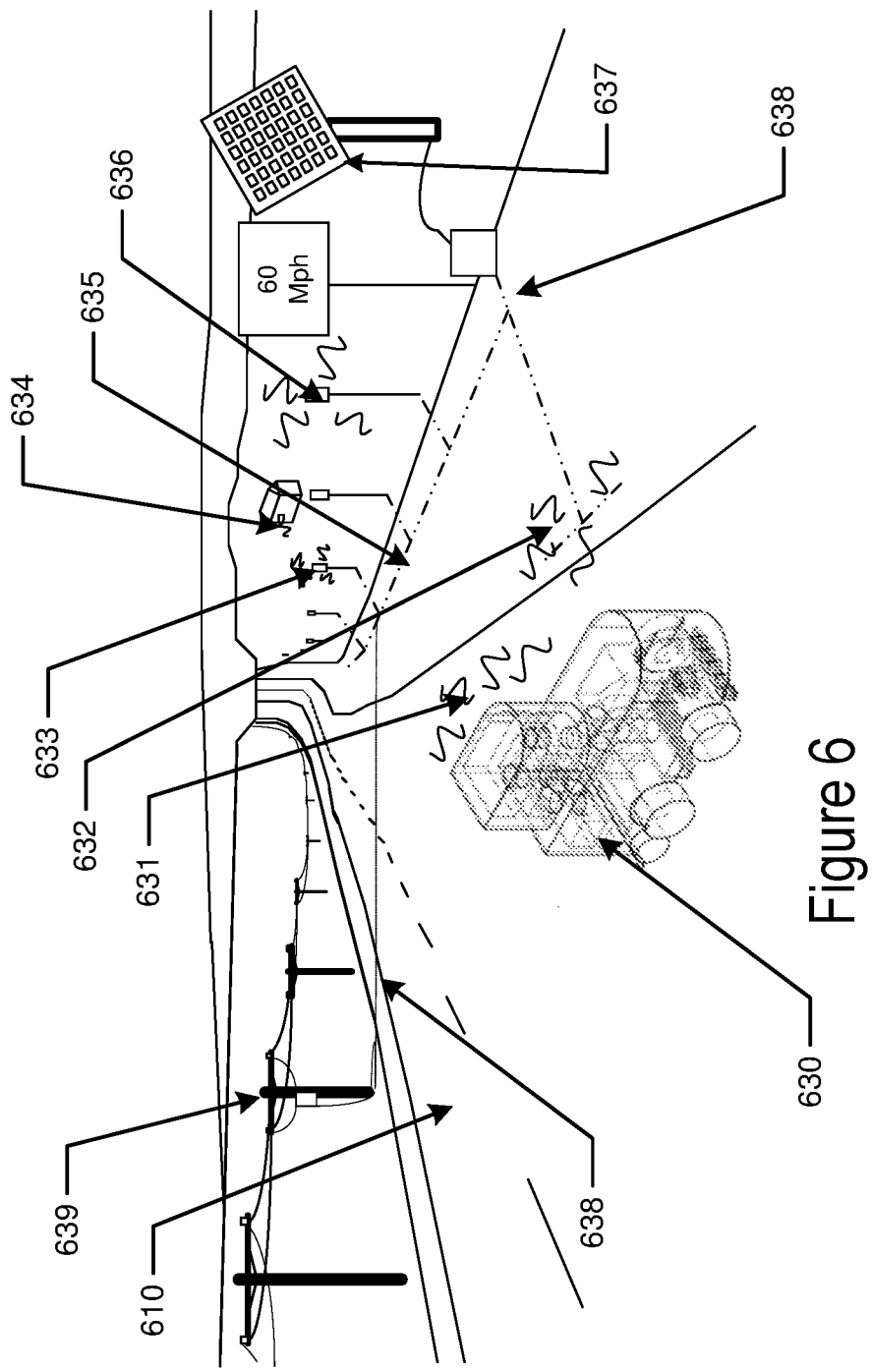
FIG. 6 illustrates an exemplary Addibot in concert with features of an advanced roadway.

Referring to FIG. 6, some features that may be produced by an Addibot configured to support roadway construction may be observed. A roadway 610 may be formed in the various standard manners that such surfaces are constructed. There may be an interface, where a roadway according to the present disclosure has an advanced formed base with a filled bed material. Thereafter, Addibots may extrude various structural features. Various interfaces in a such a construction process may create seams that are expressed at the surface of the roadway. A mobile additive manufacturing system may coat the seams in manners as have been described. Furthermore, the coated surfaces may be painted in manners using the type of systems as have been described herein. In some examples the mentioned spray nozzles may be configured to dispense paint.

As an example, some roadway designs require the possibility for a roadway to expand under heat with expansion joints or other expansion elements. In some examples, an Addibot may extrude a feature at a location along the roadway surface. The location of the feature may be present in a model of the roadway that exists in Addibots and controlling apparatus for an Addibot or combinations of Addibots. The extruded feature may, as an example, be a channel that is formed at the full height or nearly the full height of the roadway bed when the roadway is completed. In some examples, the channel may be filled with a material and a subsequent process may seal the feature.

Addibots may be used to extrude or spray supporting meshes of various kinds, shapes, and designs. In some examples a dispensed pattern may be a cross-hatch pattern. A cross-hatch pattern according to this disclosure is a pattern where two or more features of the pattern approximate intersecting lines. In other examples a unit cell pattern, where a unit cell pattern means a pattern where portions of the pattern are repeated, a beehive pattern or various other patterns that could be useful in supporting a roadbed under the various stresses that it is exposed to. In some examples, the extruded or sprayed material may be a composite of molten material with embedded fibers, nanofibers, nanotubes, and other materials which may increase strength, flexibility, ability to stretch and other material characteristics that may be desirable for a supporting material which may be embedded in a roadbed. In some examples, the bed of the roadway may be comprised of asphalt of a given thickness.

As an example, consider a bed of 16-inch thickness asphalt. In some examples, the extruded supporting material may be a full six-inch thickness, a portion of the six inches, or in some examples, the roadway may be formed in multiple levels each one having another extruded layer. In some examples, the extruded material may be formulated with supporting material embedded within where the molten material may be chosen to fully or partially mix into the hot asphalt as it is laid. A partial melt of the material may leave a strengthening pattern of fibers, nanotubes and the like within the roadway yet not create significant gaps within the roadway bed.

Another feature that may be added to the roadway surface may be a channel that may be used to embed materials such as conductive material within a roadway. There may be numerous uses for embedded conductive material including sensing of various kind, communication interface through wireless means and communication routing along the roadway. The channel may route electrical connections along a roadway and may also route them to the side of the roadway at a side channel. The resulting deposits may create features which can be sealed and or painted subsequently.

The channel may contain electrically conductive material with other materials as well. In some examples, the channel may contain communication devices such as optical fiber. The optical fiber may route signals along the roadway as well as to devices along or embedded within the roadway. The channel may be filed with insulating materials of various kinds and in some examples, portions of the channel may also may be topped with structures that act as antenna. In some other examples, the channel may be layered with different layers of materials, some of the layer may contain and insulate metallic wires, optical fiber, and other such active components.

Referring again to FIG. 6 an advanced roadway 610 in conjunction with an Addibot 630 is depicted. In some examples, an advanced roadway may have been formed with use of Addibots in a manner as described. The roadway may be formed with embedded sensors, antennas, or other devices for facilitating communication 631 between an Addibot 630 and the advanced roadway 610. In forming the advanced roadway, a generic Addibot 630 may utilize an omnidirectional drive system, such as Mecanum wheels as a non-limiting example. In utilizing such an omnidirectional drive system, may benefits with regards to orientation of the Addibot and its material distribution systems, navigating the Addibot 630 with precise linear and rotational control, among many others, may be achieved. Within the advanced roadway 610 may be communication devices 632 that may be buried within the roadway, the shoulder or the side of the roadway or be upon these locations. In some examples, there may be communication devices on roadway poles, signs, and the like. The communication 631 may comprise wireless communication and may involve radio frequency, infrared frequency, optical frequency, or other forms of wireless communication. In some examples, the advanced roadway may be formed with embedded fibers 635 formed of conductive materials or optical fiber. The embedded fibers 635 may also be considered wires. There may be connection of wires 638 to power sources along the roadway. The power sources may be standalone sources such as solar panels 637 or be connected to power transmission grids 639.

Communication signals may be routed through the advanced roadway and shoulders of roadways as depicted in FIG. 6. In some examples, the communication signals may be routed out of the roadway to a wireless transmitter 633 located along the roadway. In some examples, signals may be transmitted from one wireless transmitter 633 to another transmitter 636. A combination of transmission through conduits in the roadbed and to roadside transmitters may be used to transmit signals of various kinds. In some examples the signals may relate to the movement of traffic along the roadway. The signals may also relate to conditions along the roadway as detected by sensors or traffic itself. In other examples the signals may involve communication signals unrelated to the traffic and may be standard communications that are routed along roadways. The signals from the roadside communication transmitters such as wireless transmitter 633 may be routed to neighboring structures 634 such as residences or businesses. The transmissions in some examples may comprise standard internet communication transmissions, or in other examples the signals may relate to traffic flow along the roadway. Autonomous vehicles may use the various communications and sensor pathways as part of technological support of the traffic flow. Signals from traffic may be routed from vehicle to vehicle with the support of the roadway communication system. And, signals from traffic may be routed along wireless pathways to internet connections to central controllers for traffic flow that may be located at off road sites such as neighboring structures 634. The internet connections may be used to transmit signals from and to remote control systems. The resulting constructed structure may subsequently be processed by an application of seal coating and or painting.

In an example related to FIG. 6, the communication and control systems may be used to control repair of advanced roadways. Addibot 630, may be guided to regions that need repair of various types. The need for repair may be detected in various manners such as for example sensors or image capture devices on traffic vehicles, control information provided by human inspectors or roadway users or the like. In another use of the communication infrastructure of the exemplary advanced roadway system, the Addibot can also receive location information from the information and communication systems of the advanced roadway.

Today's advanced roadways are increasingly being used to support vehicles with increasing degrees of autonomation. Some of the basic systems rely heavily upon the ability to detect lineage of the roadway system, which in some examples may also be in conjunction with imbedded communication systems.

Figure 7:
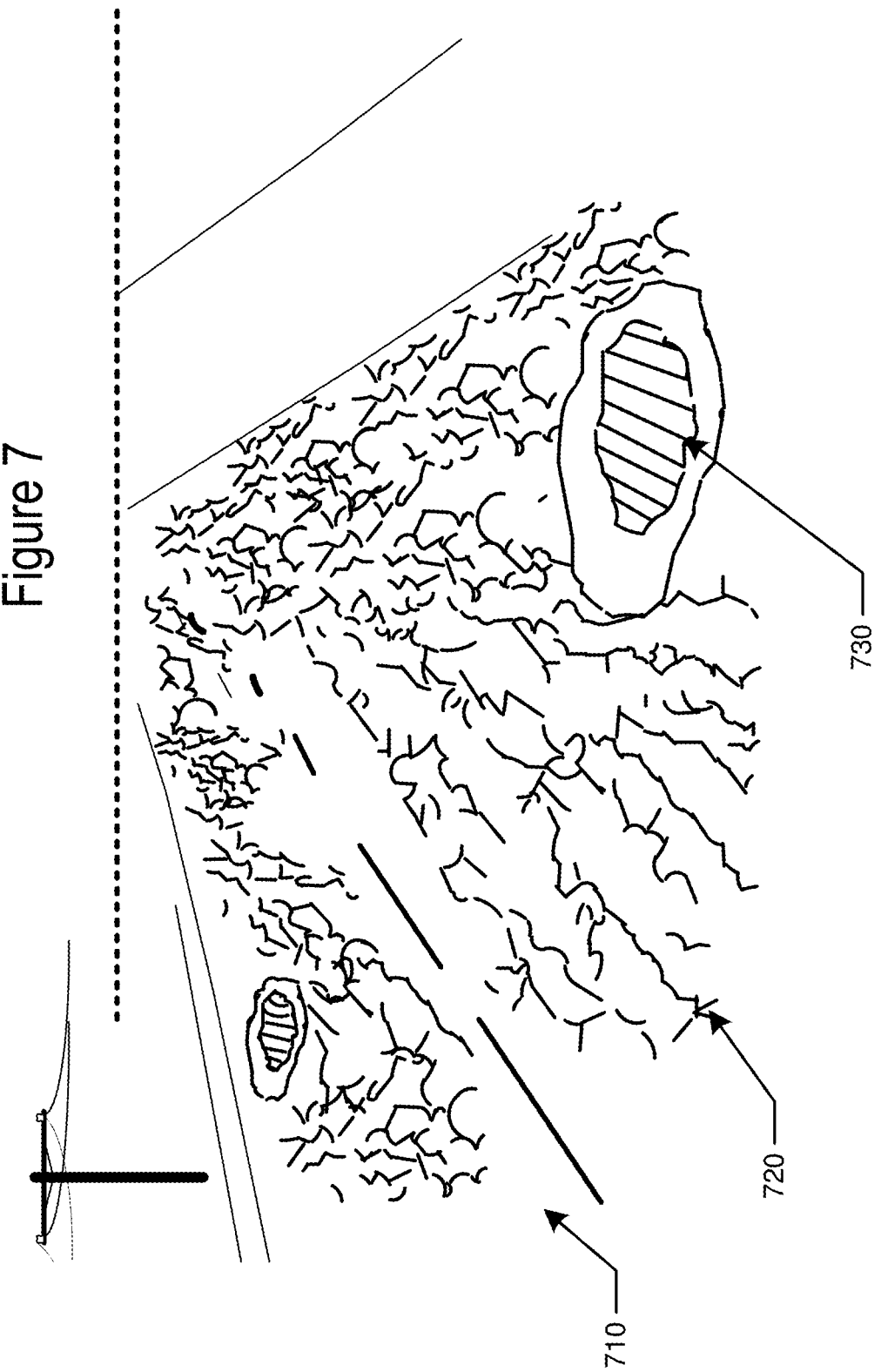
FIG. 7 illustrates an exemplary roadway with features requiring repair processing.

Referring to FIG. 7, an illustration of exemplary defects that may be repaired with systems operating with advanced drive systems for a repair of a roadway 710 is illustrated. Cracks 720 of various types may occur in a roadway surface. There may be numerous causes for the formation of cracks; but after a crack forms it can grow and generate more serious defects as water may begin to infiltrate the crack. A more serious defect may be represented by pothole 730. Here too, there may be numerous causes for the formation of potholes. However, potholes will also tend to grow over time if they are not repaired. For illustrative purposes, pothole 730 is illustrated with a level of water within the pothole. These exemplary types of defects and others may be treated by the utilization of an Addibot.

An Addibot, may be guided to a defect through communication of location information. In other examples, an Addibot may analyze a road surface to detect the presence of cracks or potholes in a non-limiting example. Teams of Addibots may survey roads and repair the defects that are found. Examples have been provided for the repair of potholes in conjunction with advanced roadways, it may be apparent that Addibots may be used in similar manners for repair of such features on generic roadways of various types.

Figure 8A:
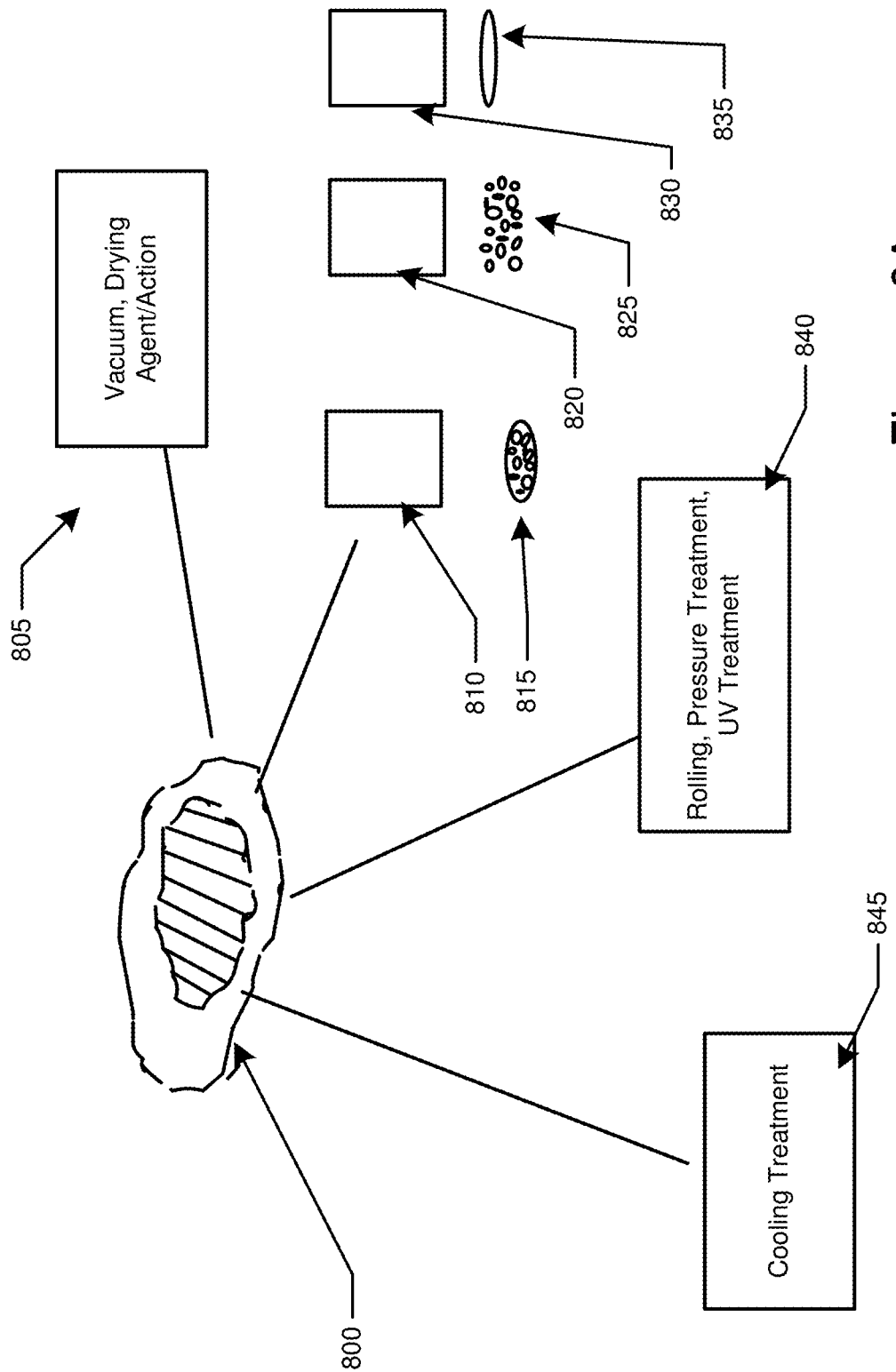
FIG. 8A illustrates exemplary methods related to repair of exemplary pot hole type road defects.

The exemplary Addibot as has been described earlier in the present disclosure may be used to perform a process of repair, and referring to FIG. 8A, a repair on a pothole 800 may be illustrated. An exemplary step for drying the pothole 805 defect may start with a vacuum process or the addition of a drying agent followed by its removal. Next filling material may be added to the pothole. In an example, a composite material 815 of filler and adhesive/sealing material may be added in addition step 810.

In another example of an addition step 820, a layer of filler material 825 such as stone may be added as an example. An addition step 830 may add a layer of adhesive and sealing material 835 upon the layer deposited in the addition step 820. In some examples, the addition step 820 and addition step 830 may be performed and then repeated in sequence numerous times until the pothole 800 is filled to an appropriate level. In some examples, the appropriate fill level may be to the top of the pothole 800 to be level with the surrounding roadway. In other examples the appropriate fill level may be above the level of the surrounding roadway.

In some examples, the filed pothole 800 may be further processed by processing after filling 840. The processing after filling may include rolling or other high-pressure treatments to consolidate the filled material. In other examples, treatments with polymerizing treatments such as exposure to Ultra-Violet light (UV) may be performed to initiate polymerization reactions with appropriate polymerizable material if it was included in the adding of a layer of adhesive or sealing material steps. In some examples, a cooling treatment 845 may be performed if the filler material and adhesive and sealing material are added hot or generate heat in their polymerization processing. The cooling treatment 845 may be performed to cool at least a surface layer of the filled material so that traffic may be allowed to run on the repaired roadway.

The exemplary Addibot as has been described earlier in the present disclosure may be used to perform a process of repair, and referring to FIG. 8B, a repair of cracks 850 may be illustrated. An exemplary step for cleaning the cracks 855 may start with a cleaning with pressurized air as a non-limiting example. Next filling material may be added to the crack. In an example, a sealing agent 865 may be added in addition step 860. The Addibot may position a component to perform the addition step 860.

In another example of an addition step 870, an array of components may deposit multiple locations of droplets 875 of sealing material. The pattern of the multiple droplets may be controlled by a controller within the Addibot. As the Addibot moves over the roadway it may dispense sealing material at appropriate locations based on crack location. In some examples, the steps at 860 and 870 may be performed and then repeated in sequence numerous times until the crack 850 at a particular location is filled to an appropriate level. In some examples, the appropriate fill level may be to the top of the crack 850 to be level with the surrounding roadway. In other examples the appropriate fill level may be above the level of the surrounding roadway.

In some examples, the filled crack 850 may be further processed by processing after filling 880. The processing after filling may include rolling or other high-pressure treatments to consolidate the filled material. In other examples, treatments with polymerizing treatments such as exposure to Ultra-Violet light (UV) may be performed to initiate polymerization reactions with appropriate polymerizable material if it was included in the adding of sealing material steps. In some examples, a cooling treatment 885 may be performed if the filler material and adhesive and sealing material are added hot or generate heat in their polymerization processing. The cooling treatment 885 may be performed to cool at least a surface layer of the filled material so that traffic may be allowed to run on the repaired roadway. Examples have been provided for the repair of cracks in conjunction with discussion of advanced roadway, it may be apparent that Addibots may be used in similar manners for repair of such features on generic roadways of various types.

A Mecanum drive system or other omnidirectional drive system may afford a mobile additive manufacturing system greater degrees of freedom to perform additive manufacturing. For example, in a process of crack repair where the cracks occur across the road surface or are in multiple rut locations for example, the ability to move laterally with the additive manufacturing element remaining in its relative orientation to the roadway course. This may improve effectiveness, efficiency, and rate of operational performance. In some examples, the repair of light crack features may be improved by multiple passes of a seal coating system over the region under treatment. The ability to move laterally to such a repair location may be one of many such examples that may be improved with use of omnidirectional drive capabilities.

Artificial Intelligence and Machine Learning in Mobile Additive Manufacturing

An Addibot may be configured to utilize various degrees of data processing equipment during the course of its operations, and various aspects of its operations may be therefore automated. These automation aspects may define one of the types of operations whose automation effectiveness may be improved by the incorporation of machine learning or more generally artificial intelligence (which may also be classified as cognitive computing.) As shall be described in following sections there are also general aspects of Addibot type operations that may be configured to utilize artificial intelligence aspects.

In a general way of looking at artificial intelligence, a software program, which may in some examples be enhanced with customized computing and sensing hardware, is configured to performs task such as image or pattern recognition, evaluate performance of the task and adjust the operational aspects to improve performance. There may be numerous manners and algorithms that may be used to perform machine learning or cognitive computing. An example of artificial intelligence processing with particular reference to image processing may be found in the U.S. Pat. No. 9,904,889 entitled METHODS AND SYSTEMS FOR ARTIFICIAL COGNITION the contents of which were previously included by reference. These algorithms, processes and processing flows may be applied to the various uses of machine learning as described herein. It may also be noted that variations on these techniques and processes may naturally be adopted, and in some examples different types of artificial intelligence algorithms may be applied to the operations as described.

In an example, an Addibot may be optimized to perform repairs of cracks in a roadway surface. Amongst the tasks that are inherently performed in these operations is the imaging of a roadway and processing the related images to determine the presence of crack type features in the images. Cracks may run in the direction of traffic flow of a roadway, or perpendicular to such traffic, and more generally at any general direction in between. An artificial intelligence algorithm may be trained with many types of examples of different cracks. In some examples, a crack may have some or all of its structure previously treated to fill the crack, the algorithm may be trained to discern the difference from such a filled crack and an unfilled crack and may even determine if a filled crack nevertheless requires a subsequent repair operation. Even when the determination of a crack is made, other aspects of the imaging that a cognitive intelligence system may work on is to determine parametric aspects of the crack. For example, how deep, how wide, and how graded the sidewalls of the cracks may be relevant information to extract efficiently from the scanning information.

Part of the learning may be to determine effective alterations of the parameters of the imaging and sensing equipment such as in nonlimiting examples, the intensity of irradiation, the wavelength, or bands of wavelengths to use, as well as the supplementation of imaging data with other techniques such as profilometry or sonography.

In some examples, the artificial intelligence system may be trained to recognize cracks and discern them from other defects such as potholes and adjust processing to the different defect type. The algorithms of the artificial intelligence may utilize in non-limiting examples, k-means clustering, adaptive resonance, reinforcement learning, Q-learning, or neural network-based models for this and all artificial intelligence algorithmic learning approaches discussed within the present specification. For crack processing, the artificial intelligence system may discern that a non-repaired crack is a certain depth and width with a certain cross sectional profile and that the most effective means of filling is to apply a certain type of crack filling material at a certain temperature with a certain type of post processing such as rolling as a non-limiting example. The Addibot may have a second imaging system trained at observing the underlying roadway after a repair operation has been prepared. The artificial intelligence system may have initially been trained with exemplary images of roadway features that are cracks and non-cracks as well as for the cracks exemplary images of effective and non-effective repair of the cracks. With this training, the artificial intelligence system may learn effective process steps that produce an effective result when imaged by the second imaging system or another imaging system that can provide feedback to the artificial intelligence system. It may be possible that the artificial intelligence may learn gradations in the effectiveness of the crack repair or other roadway repair or construction activity and further improve the processing effectiveness. In some cases, the environment such as temperature, degree of sunlight or moonlight and such variables may create variation in the imagery obtained by the system, here too the artificial intelligence system may learn to interpret the imagery and adjust processing conditions as appropriate.

In some examples, an artificial intelligence system may learn to recognize different types of defects ranging from overall defect categories; such as cracks, potholes, missing pavement, missing lineage such as painted border lines and the like; to more specific categorization like different types of crack types. The artificial intelligence system may determine, for example that a particular crack type may require a customized processing such as a sand blasting, heat treatment or chemical pretreatment for example.

In some examples, an image may include evidence of previous repair attempts. The actual process employed may vary based on the observation of these previous repairs. As well, if the repair was performed by the Addibot system previously, the artificial intelligence system may include the observation of the repair as a time progression of a particular repair protocol. The artificial intelligence system may assess the effectiveness of the previous repair much as it would use the imagery of a second imaging system to assess the effectiveness. In other examples, a different type of analysis may be performed on an aged sample based on expected progression of the repair under weathering conditions.

In some examples, an artificial intelligence system may be used to calculate paths taken by an Addibot. Different speeds and direction may be used for efficiency and effectiveness of a repair or construction action. As has been discussed herein, Mecanum wheels and other multidirectional wheel types may allow for increased flexibility. The increased flexibility may create a more complex modelling environment. An artificial intelligence system may be particularly effective in recognizing patterns of movements of the Addibot in reference to a particular task and its associated path of movement to accomplish the task. As a non-limiting example, one or more Addibots may be configured to repair a parking lot surface, blast clean existing painted lines and then repainting the lines in a different configuration. An artificial intelligence system may recognize the task and determine an effective repair protocol taking into the analysis factors such as environmental temperature, humidity and the drying rate of the repair materials employed and the paints employed which may invoke paths which do not cross over certain cracks that may not be cured at a certain time as a non-limiting example. In some examples, the path may include information provided by scanning of the work area with aerial views such as those provided from a drone-based survey.

In some examples, an Addibot may release material from a two-dimensional matrix of printing elements. The process may allow repair protocols to occur at relatively rapid rates. The rapid rate of processing may increase the complexity of modelling the repair protocol as effects such as wind and thermal interactions influenced by the movement may become increasingly important as the speed increases. An artificial intelligence system may invoke machine learning protocols to characterize results at higher speeds.

In some examples, an artificial intelligence processing engine may be located on a server or the cloud and interact with Addibots via communication channels such as wireless and wired communication. In some examples a WiFi signal may be used to communicate with a team of Addibots each receiving information and in some examples control signals from the artificial intelligence processing engine. In some hybrid examples, artificial intelligence capabilities may reside both on a server/cloud-based infrastructure as well as locally to the Addibots or in one or more Addibots of a team itself.

Artificial Intelligence may be used, in some examples, to coordinate scheduling as part of the path planning of Addibots for repair or construction purposes. The artificial intelligence algorithms may take inputs of weather, climate, traffic patterns and roadway materials and/or construction techniques to coordinate the scheduling. In some examples, the artificial intelligence analysis may anticipate periods of least traffic impact, or cost or other such metrics of optimization. Safety of the work team, and Addibot hardware may be included in the metrics of evaluation for the algorithms.

A team of Addibots may utilize materials at differing rates for the individuals. An artificial intelligence capability may analyze patterns of materials usage and adjust individual Addibot scopes and path programming to optimize active time of work. In some examples units may resupply the Addibots. The scheduling of resupply may be coordinated with pattern recognition of optimized path. In some examples, Addibots may return to a central supply to obtain more resources. The optimization of wait times at a resupply locations may be a parameter to optimize goals of the machine learning units.

Omnidirectional Drive Schemes

Referring to FIG. 9A, a close up of a Mecanum type omnidirectional drive component 910 is illustrated. The Mecanum wheel is made up of smaller oblate cylindrical roller components 911 that are oriented at an angle to the axis of the wheel. In a typical configuration, shown in FIG. 9B, four Mecanum wheels 920, 922, 924 and 926 may be oriented at the corners of the system. Each of the wheels may have an independent motor 921, 923, 925 and 927 which can be independently driven in a clockwise or counterclockwise direction. Various combinations of clockwise or counterclockwise, which may also be referred to as forward and reverse, driving of the individual motors may be achieved due to this independent driving. Referring to FIG. 9C, some various general movement directions that may be portrayed with different combinations of clockwise and counterclockwise drive on the wheels. The directions include forward 947, left 941, forward left 940, right 945, forward right 946, reverse 943, reverse left 942, and reverse right 944. As well rotation around the center point counter clockwise 930 and clockwise 935.

Figure 9D:
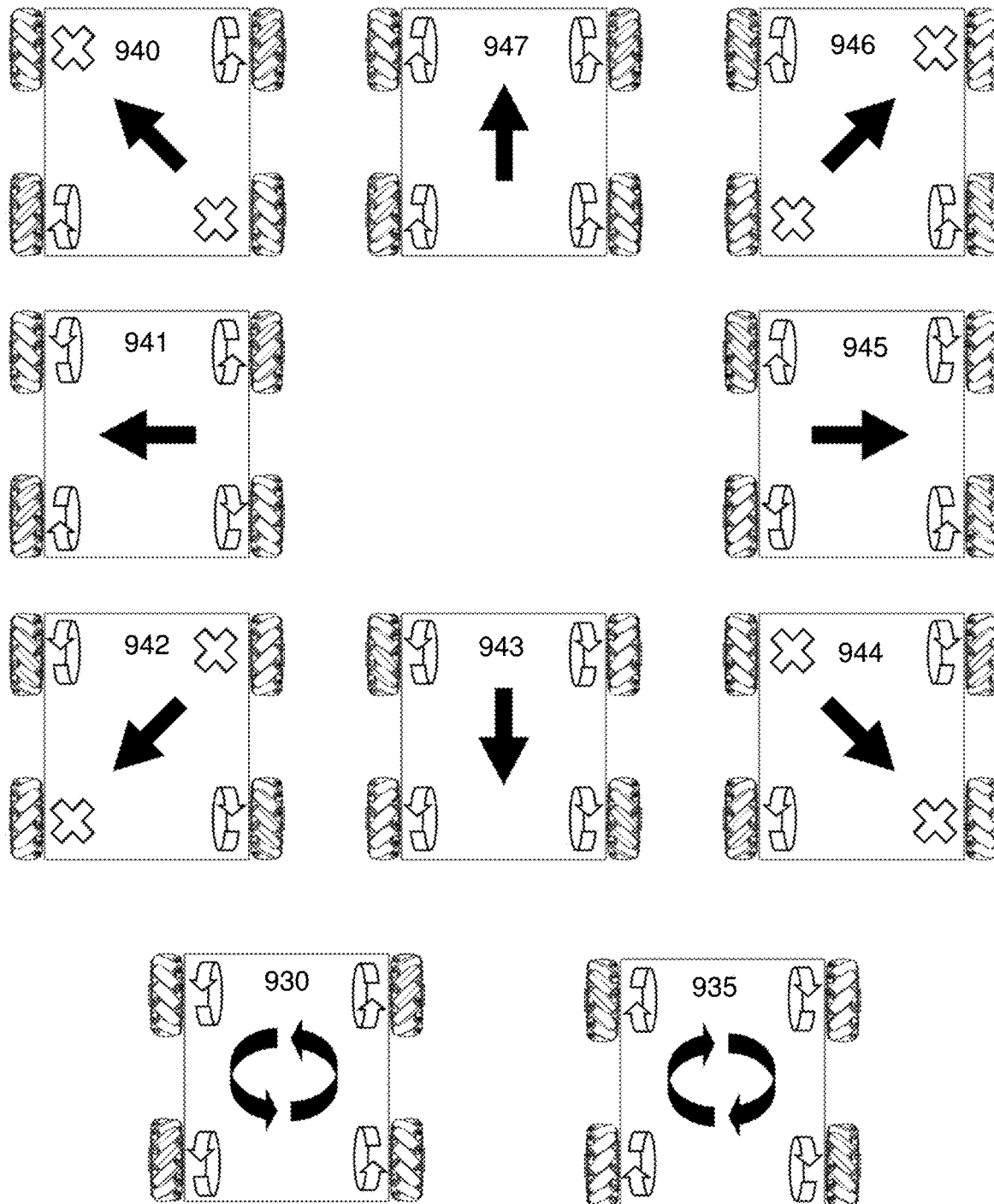
Figure 9E:
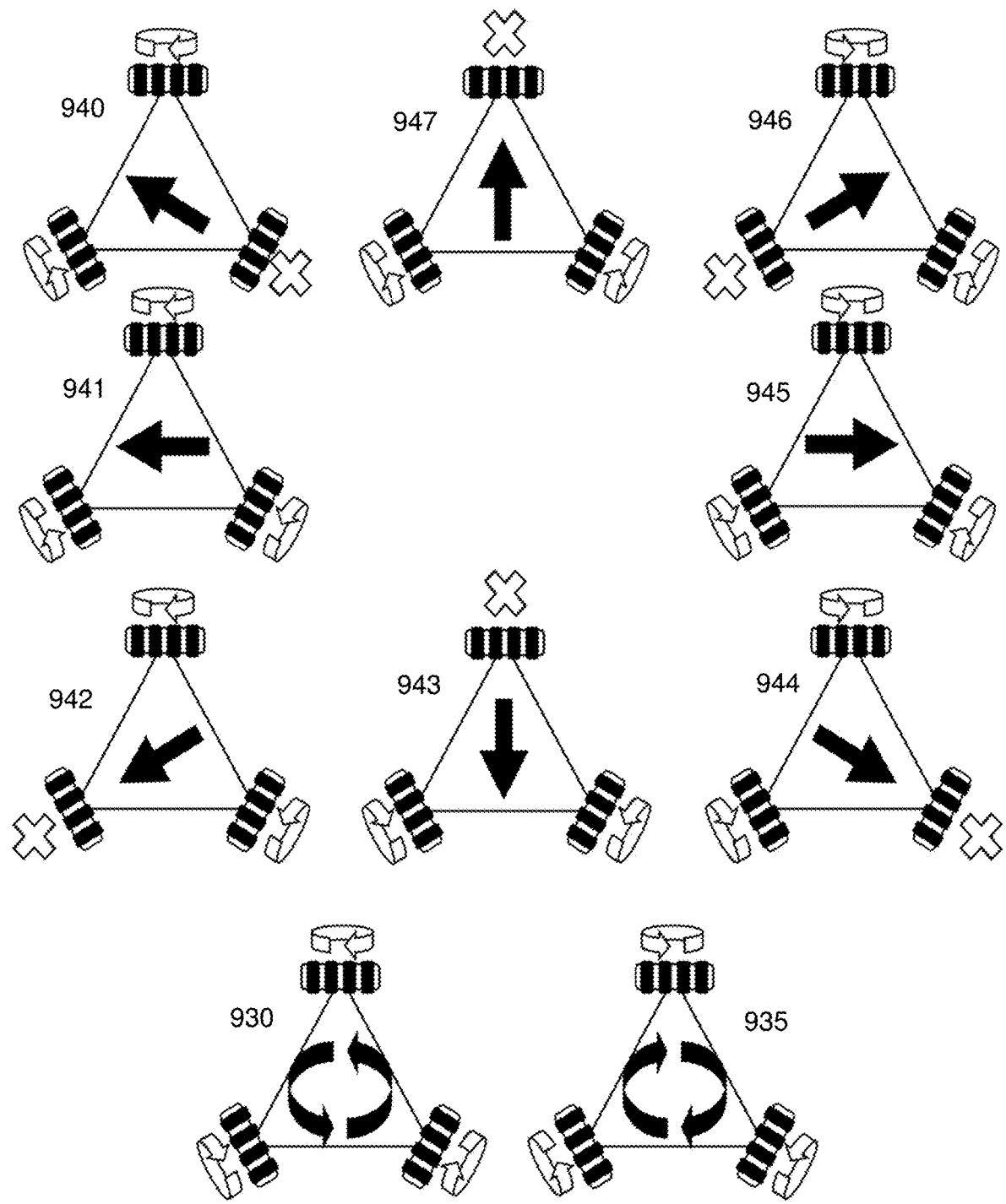
Figure 9F:
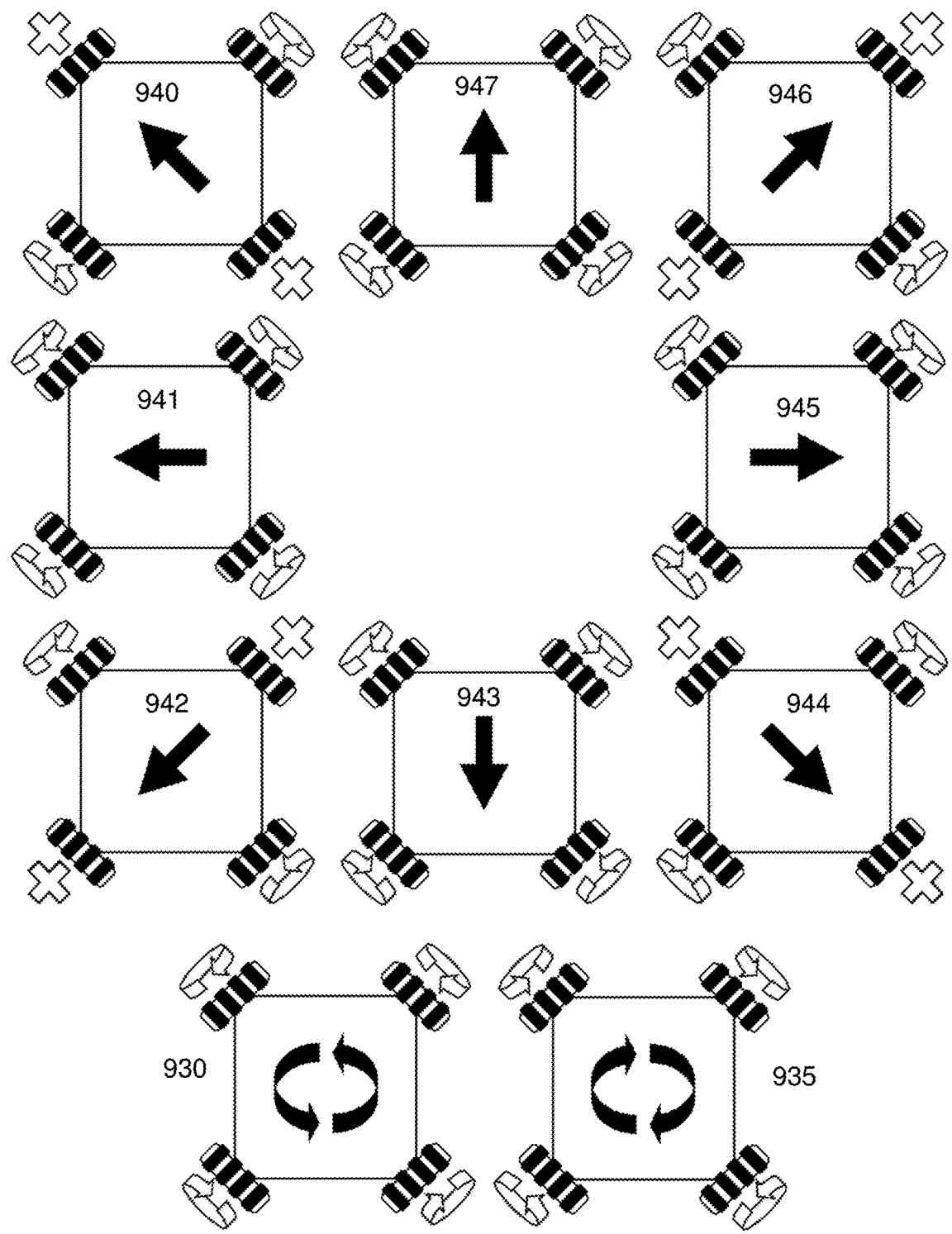

Referring to FIG. 9D, the directional combination is illustrated for an exemplary Mecanum combination of wheels the general movement directions are marked with black arrows and numbered as described in FIG. 9C. For each of these directions, the corresponding direction of travel is indicated schematically for each of the wheels. Clockwise and counterclockwise directions of the motors are indicated by respective white directional arrows. For the case where the wheels do not rotate an X is indicated at the wheel position. Referring to FIG. 9E, the respective directions are shown are shown for a three wheel—"omni wheel" implementation. And, referring to FIG. 9F, the respective directions are shown for a four wheel—"omni wheel" implementation.

Referring to FIG. 10A, an example path 1002 of an Addibot 1001 equipped with omnidirectional drive systems. A curved path 1002 may be obtained without steering while controlling the directions of the individual wheels to perform the task. Referring to FIG. 10B, an illustration of depositing a deposition 1012 on a surface with an Addibot 1011 configured with an omnidirectional drive system is illustrated. In an example the Addibot 1011 may proceed along a path and then make a turn to move the body around an axis point (with a zero radius turn) to proceed at a 90-degree course to the initial direction. With another 90 degrees turn, the Addibot may proceed without running backwards or over a previous deposition. Referring next to FIG. 10C an Addibot 1021 is illustrate in the treatment of a crack 1022. The crack may have a general direction that is across the roadway. Using omnidirectional drive, the Addibot may proceed towards the right-side direction relative to FIG. 10C while depositing a coating to treat the crack, a novel manner to deposit with a mobile additive manufacturing system where the drive moves along a printing path. Furthermore, referring to FIG. 10D, an Addibot 1031 may progress along a complicated path 1032 which may be achieved with an omnidirectional drive system of the Addibot 1031 without the need for a steering system, and therefore, without the limitation on the radius of such turning. Therefore, numerous complicated paths of movements may be engaged with an omnidirectional drive system which may allow for free path planning of the deposition process of a mobile additive manufacturing system.

Addibots for Brine Treatment

Weather sensing units which may be connected to artificial intelligence algorithms, in some examples, may drive a need to apply a treatment of brine to roadways to maximize roadway performance under cold weather conditions. An Addibot may provide unique capability of directed application of selectable regions based on models of temperature and precipitation. In some examples, the amount of application, and the timing and number of times of application of a surface may be system parameters.

CONCLUSION

A number of examples of the present disclosure have been described. While this specification contains many specific implementation details, they should not be construed as limitations on the scope of any inventions or of what may be claimed, but rather as descriptions of features specific to particular examples of the present disclosure. Specifically seal coating examples have been described, where numerous other functions may be possible within the scope of the disclosure particularly where an omnidirectional drive system may allow for the mobile additive manufacturing system to move the additive manufacturing elements over a location which will not have wheels passing over thereafter and be flexible to cover a wide range of paths and working surface shapes.

Certain features that are described in this specification in the context of separate examples can also be implemented in combination in a single embodiment. Conversely, various features that are described in the context of a single embodiment can also be implemented in combination in multiple examples separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the examples described above should not be understood as requiring such separation in all examples, and it should be understood that the described components and systems can generally be integrated together in a single product or packaged into multiple products.

Thus, particular examples of the subject matter have been described. Other examples are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Nevertheless, it will be understood that various modifications may be made without departing from the spirit and scope of the claimed invention. While the disclosure has been described in conjunction with specific examples, it is evident that many alternatives, modifications, and variations will be apparent to those skilled in the art in light of the foregoing description. Accordingly, this description is intended to embrace all such alternatives, modifications and variations as fall within its spirit and scope. Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments. Examples of Addibots may include all system components or a subset of components and may act in multiples to perform various functions. Thus, while particular embodiments of the subject matter have been described, other embodiments are within the scope of the following claims.

What is claimed is:

1. A mobile additive manufacturing apparatus comprising:
    an omnidirectional drive system operative to move the apparatus along a surface, wherein the omnidirectional drive system employs at least a first omnidirectional wheel directly attached to a first motor, and wherein the first motor has operational modes to be engaged in a forward moving, reverse moving or stationary configuration,
    a navigation system to determine location;
    a controller capable of executing algorithms and providing control signals,
    a vision system capable of scanning the surface and measuring a topography of the surface;
    an additive manufacturing system to deposit at least a first material in a prescribed location on the surface according to a digital model processed by the controller wherein the additive manufacturing system deposits material while the omnidirectional drive system changes a direction of movement of the mobile additive manufacturing apparatus using a change in an operational mode of at least the first omnidirectional wheel; and
    a power system capable of providing power to operate at least the drive system, navigation system, controller and additive manufacturing system;
    an artificial intelligence processing system, wherein the artificial intelligence processing system is one of a separate system from the controller or a sub-system of the controller; and
    wherein the artificial intelligence processing system comprises an artificial intelligence chip and; wherein the artificial intelligence chip has been customized to interface with the vision system, the omnidirectional drive system, and the additive manufacturing system.

2. The apparatus of claim 1 wherein the artificial intelligence chip has been further customized to interface with the controller, wherein the controller is a separate system from the apparatus.

3. A method of depositing a material on a surface, the method comprising:
    obtaining a mobile additive manufacturing apparatus comprising:
        an omnidirectional drive system operative to move the apparatus along a surface, wherein the omnidirectional drive system employs at least a first omnidirectional wheel directly attached to a first motor, and wherein the first motor has operational modes to be engaged in a forward moving, reverse moving or stationary configuration,
        a navigation system to determine location,
        a controller capable of executing algorithms and providing control signals,
        a vision system capable of scanning the surface and measuring a topography of the surface,
        an additive manufacturing system to deposit at least a first material in a prescribed location on the surface according to a first digital model processed by the controller wherein the additive manufacturing system deposits material while the omnidirectional drive system changes a direction of movement of the mobile additive manufacturing apparatus using a change in an operational mode of at least the first omnidirectional wheel,
        a power system capable of providing power to operate at least the drive system, navigation system, controller and additive manufacturing system;
    orienting the mobile additive manufacturing apparatus upon the surface, wherein the orienting comprises engaging at least the first omnidirectional wheel directly attached to the first motor into one of a forward moving or reverse moving configuration;
    scanning a portion of the surface beneath the mobile additive manufacturing apparatus with the vision system;
    creating the first digital model, wherein the first digital model is optimized for path planning for movement with the omnidirectional drive system and operation of the additive manufacturing system;
    initiating processing with the additive manufacturing system according to the first digital model, and simultaneously engaging at least the first omnidirectional wheel directly attached to the first motor into one of a forward moving or reverse moving configuration according to the first digital model, wherein the mobile additive manufacturing apparatus changes a direction of motion without rotating the first omnidirectional wheel; and
    scanning a second portion of the surface beneath the mobile additive manufacturing apparatus with the vision system after a movement of the mobile additive manufacturing apparatus.

4. The method of claim 3 wherein the additive manufacturing system deposits a seal coating material.

5. The method of claim 4 wherein the additive manufacturing system deposits the seal coating material with one or both of: a spray system and a drip system.

6. The method of claim 5 wherein the additive manufacturing system deposits the seal coating material wherein the one or more of a spray system or drip system components are attached to a rotational gantry, wherein a rotational orientation is set according to the first digital model.

7. The method of claim 6 wherein the additive manufacturing system additionally comprises a flexible blade, wherein the flexible blade scrapes material upon the surface.

8. The method of claim 4 wherein the first digital model is based upon a model of at least one of: a roadway, a driveway, and a parking lot.

9. The method of claim 8 wherein the first digital model includes a path plan where the omnidirectional drive system is used to create a continuous movement flow of the mobile additive manufacturing apparatus during operation of the additive manufacturing system wherein wheels of the omnidirectional drive system do not pass over portions of the surface that have been processed with the additive manufacturing system.

* * * * *